(12) United States Patent
Shilimkar et al.

(10) Patent No.: US 11,777,849 B2
(45) Date of Patent: Oct. 3, 2023

(54) MULTI-CUSTOMER (MULTI-TENANTS) SUPPORT WITH HYPERVISOR BASED BOND IMPLEMENTATION

(71) Applicant: Oracle International Corporation, Redwood Shores, CA (US)

(72) Inventors: Santosh Narayan Shilimkar, San Jose, CA (US); Bryce Eugene Bockman, Seattle, WA (US); Jagwinder Singh Brar, Bellevue, WA (US)

(73) Assignee: Oracle International Corporation, Redwood Shores (CA)

( * ) Notice: Subject to any disclaimer, the term of this patent is extended or adjusted under 35 U.S.C. 154(b) by 226 days.

(21) Appl. No.: 17/219,475

(22) Filed: Mar. 31, 2021

(65) Prior Publication Data

US 2022/0182301 A1 Jun. 9, 2022

Related U.S. Application Data

(60) Provisional application No. 63/121,656, filed on Dec. 4, 2020.

(51) Int. Cl.
*H04L 45/586* (2022.01)
*H04L 43/0817* (2022.01)
(Continued)

(52) U.S. Cl.
CPC ........ *H04L 45/586* (2013.01); *G06F 9/45558* (2013.01); *H04L 41/12* (2013.01);
(Continued)

(58) Field of Classification Search
CPC ... H04L 45/586; H04L 61/5007; H04L 41/12; H04L 41/16; H04L 43/0805;
(Continued)

(56) References Cited

U.S. PATENT DOCUMENTS 9,100,274 B1 * 8/2015 Ghosh ................... H04L 49/552
9,473,400 B1 * 10/2016 DeVilbiss ............... H04L 45/70
(Continued)

OTHER PUBLICATIONS

U.S. Appl. No. 17/219,470, Non-Final Office Action dated Sep. 6, 2022, 22 pages.
(Continued)

*Primary Examiner* — Nicholas R Taylor
*Assistant Examiner* — Chong G Kim
(74) *Attorney, Agent, or Firm* — Kilpatrick Townsend & Stockton LLP

(57) ABSTRACT

Systems and methods for transparent high availability for multi-customer support with hypervisor based bond implementation. The method can include creating a network path bond between a plurality of compute instances and a plurality of Network Virtualization Devices ("NVD"), the network path bond comprising a plurality of network paths, identifying a monitoring bond coupling the plurality of NVDs to a monitoring agent, creating a number of monitoring VNICs, each of the number of monitoring VNICs residing in one of the plurality of NVDs, overlaying a unique IP address to each of the monitoring VNICs, determining with the monitoring agent a health of at least one of network paths, the network paths including an active network path and an inactive network path, and activating the inactive network path when the active network path fails.

20 Claims, 15 Drawing Sheets

(51) Int. Cl.
  *H04L 45/28*      (2022.01)
  *H04L 45/02*      (2022.01)
  *H04L 43/0805*    (2022.01)
  *H04L 43/10*      (2022.01)
  *H04L 67/10*      (2022.01)
  *H04L 61/5007*    (2022.01)
  *G06F 9/455*      (2018.01)
  *H04L 41/12*      (2022.01)
  *H04L 41/16*      (2022.01)
  *H04L 101/622*    (2022.01)

(52) U.S. Cl.
  CPC .......... *H04L 41/16* (2013.01); *H04L 43/0805* (2013.01); *H04L 43/0817* (2013.01); *H04L 43/10* (2013.01); *H04L 45/02* (2013.01); *H04L 45/28* (2013.01); *H04L 61/5007* (2022.05); *H04L 67/10* (2013.01); *G06F 2009/4557* (2013.01); *G06F 2009/45595* (2013.01); *H04L 2101/622* (2022.05)

(58) Field of Classification Search
  CPC ..... H04L 43/0817; H04L 43/10; H04L 45/02; H04L 45/28; H04L 67/10; H04L 2101/622; G06F 9/45558; G06F 2009/4557; G06F 2009/45595
  USPC .......................................................... 709/224
  See application file for complete search history.

(56) References Cited

U.S. PATENT DOCUMENTS

| | | | |
|---|---|---|---|
| 2008/0002714 A1 | 1/2008 | Belgaied et al. | |
| 2012/0265910 A1* | 10/2012 | Galles | ................ G06F 11/2005 710/300 |
| 2012/0324442 A1 | 12/2012 | Barde | |
| 2013/0173810 A1 | 7/2013 | Subramaniam | |
| 2016/0050145 A1 | 2/2016 | Tsirkin | |
| 2016/0188527 A1 | 6/2016 | Cherian et al. | |
| 2016/0191304 A1* | 6/2016 | Muller | .................. H04L 45/586 370/220 |
| 2017/0034046 A1 | 2/2017 | Cai et al. | |
| 2018/0157537 A1 | 6/2018 | Chen et al. | |
| 2018/0176127 A1 | 6/2018 | Cai et al. | |
| 2019/0052598 A1* | 2/2019 | Hira | ..................... H04L 61/5007 |
| 2019/0173780 A1 | 6/2019 | Hira et al. | |
| 2019/0222508 A1 | 7/2019 | Babu et al. | |
| 2019/0356728 A1* | 11/2019 | Devilbiss | ............ H04L 67/1008 |
| 2019/0377646 A1 | 12/2019 | Schimke et al. | |
| 2020/0007383 A1 | 1/2020 | Efraim et al. | |
| 2020/0029458 A1 | 1/2020 | Jau et al. | |
| 2020/0081728 A1 | 3/2020 | Chandrashekhar et al. | |
| 2021/0234715 A1 | 7/2021 | Liu | |
| 2021/0385149 A1* | 12/2021 | Suryanarayana | ....... H04L 49/25 |
| 2021/0385155 A1* | 12/2021 | Suryanarayana | ....... H04L 45/28 |

OTHER PUBLICATIONS

U.S. Appl. No. 17/219,477, Final Office Action dated Jul. 8, 2022, 14 pages.
U.S. Appl. No. 17/219,477, Non-Final Office Action dated Mar. 3, 2022, 12 pages.
U.S. Appl. No. 17/219,477, Notice of Allowance dated Nov. 30, 2022, 8 pages.
U.S. Appl. No. 17/219,477, Notice of Allowance dated Mar. 16, 2023, 9 pages.

* cited by examiner

MULTI-CUSTOMER (MULTI-TENANTS) SUPPORT WITH HYPERVISOR BASED BOND IMPLEMENTATION

CROSS-REFERENCES TO RELATED APPLICATIONS

The application claims the benefit of U.S. Provisional Application No. 63/121,656, filed on Dec. 4, 2020, and entitled "L3 State Replication Between SmartNICs On Failover and/or L3 State At RVRs And Pulled Down To SmartNICs When Needed."

TECHNICAL FIELD

The present disclosure relates generally to network virtualization.

BACKGROUND

A compute instance or other resources hosted on a CSPI may be accessible, and may access other computer instances or devices via an "Network virtualization device," NVD such as a SmartNIC. The NVD may contain a VNIC assigned to the compute instance. The VNIC forms a virtual port to the VCN for the compute instance. However, in the event that this NVD fails, or communication with the NVD is interrupted, the ability of the compute instance to communicate with other compute instances or devices on the VCN is impaired, and in some instances, can be stopped. Further, it can be very difficult to quickly detect the failure of this NVD and even more challenging to quickly failover routing and communications to another NVD. This can result in interruptions in processing and/or result in the inability to access resources and services contained in a VCN. Accordingly, further developments are desired.

BRIEF SUMMARY

Some embodiments relate to a method that can include creating a network path bond between a plurality of compute instances and a plurality of Network Virtualization Devices ("NVD"), each of the plurality of NVDs including a Virtualized Network Interface Card ("VNIC") for each of the compute instances. In some embodiments, each of the VNICs has an overlay IP address corresponding to an IP address of the compute instance associated with the VNIC. In some embodiments, the network path bond includes a plurality of network paths, and in some embodiments, each of the plurality of network paths connects the each of the compute instances to associated VNIC of one of the plurality of NVDs. The method can include identifying a monitoring bond coupling the plurality of NVDs to a monitoring agent, creating a number of monitoring VNICs, each of the number of monitoring VNICs residing in one of the plurality of NVDs, overlaying a unique IP address to each of the monitoring VNICs, determining with the monitoring agent a health of at least one of network paths, the network paths including an active network path and an inactive network path, and activating the inactive network path when the active network path fails.

In some embodiments, the method includes identifying service tenancy. In some embodiments, the service tenancy can be an administrative virtual cloud network. In some embodiments, the unique IP addresses are received from the service tenancy. In some embodiments, the unique IP addresses are determined by the monitoring agent.

In some embodiments, the method includes identifying one of the network paths as an active network path. In some embodiments, the method includes identifying at least one of the network paths as an inactive network path. In some embodiments, at least one of the plurality of compute instances comprises a virtual machine. In some embodiments, the plurality of compute instances on located on a single physical server. In some embodiments, the plurality of compute instances share the active network path.

In some embodiments, activating the inactive network path when the active network path fails includes identifying all of the VNICs associated with the NVD of the failed network path, and updating routing tables to associate the overlaid IP addresses of the VNICs of the failed network path with VNICs of the activated inactive network path. In some embodiments, the active network path fails when performance of the active network path drops below a threshold level. In some embodiments, the threshold level identifies a minimum data transmission speed for the active network path.

In some embodiments, at least some of the plurality of NVDs comprise a SmartNIC. In some embodiments, each of the VNICs comprises a MAC learning VNIC. In some embodiments, determining with the monitoring agent the health of at least one of network paths includes sending a communication to the active network path via the monitoring bond, providing information from the monitoring bond to the monitoring agent based on any response received to the communication, and determining the health of the at least one of the network paths with the monitoring agent based on the information provided by the monitoring bond.

Some embodiments relate to a non-transitory computer-readable storage medium storing a plurality of instructions executable by one or more processors. When executed by the one or more processors, the plurality of instructions cause the one or more processors to create a network path bond comprising a plurality of network paths between a plurality of compute instances and a plurality of Network Virtualization Devices ("NVD"), identify a monitoring bond coupling the plurality of NVDs to a monitoring agent, create a number of monitoring VNICs, each of the number of monitoring VNICs residing in one of the plurality of NVDs, overlay a unique IP address to each of the monitoring VNICs, determine with the monitoring agent a health of at least one of network paths, the network paths including an active network path and an inactive network path, and activate the inactive network path when the active network path fails.

In some embodiments, each of the plurality of NVDs can include a Virtualized Network Interface Card ("VNIC") for each of the compute instances. In some embodiments, each of the VNICs can have an overlay IP address corresponding to an IP address of the compute instance associated with the VNIC. In some embodiments, each of the plurality of network paths connects the each of the compute instances to associated VNIC of one of the plurality of NVDs. In some embodiments, the plurality of compute instances share the active network path. In some embodiments, activating the inactive network path when the active network path fails includes identifying all of the VNICs associated with the NVD of the failed network path, and updating routing tables to associate the overlaid IP addresses of the VNICs of the failed network path with VNICs of the activated inactive network path.

Some embodiments relate to a system that can include a plurality of Network Virtualization Devices ("NVD") and a processor. The processor can create a network path bond between a plurality of compute instances and a plurality of Network Virtualization Devices ("NVD"). In some embodiments, each of the plurality of NVDs can include a Virtualized Network Interface Card ("VNIC") for each of the compute instances. In some embodiments, each of the VNICs can have an overlay IP address corresponding to an IP address of the compute instance associated with the VNIC. In some embodiments, the network path bond can include a plurality of network paths, each of the plurality of network paths connecting the each of the compute instances to associated VNIC of one of the plurality of NVDs. The processor can identify a monitoring bond coupling the plurality of NVDs to a monitoring agent, create a number of monitoring VNICs, each of the number of monitoring VNICs residing in one of the plurality of NVDs, overlay a unique IP address to each of the monitoring VNICs, determine with the monitoring agent a health of at least one of network paths, the network paths including an active network path and an inactive network path, and activate the inactive network path when the active network path fails.

In some embodiments, the plurality of compute instances share the active network path. In some embodiments, activating the inactive network path when the active network path fails includes identifying all of the VNICs associated with the NVD of the failed network path, and updating routing tables to associate the overlaid IP addresses of the VNICs of the failed network path with VNICs of the activated inactive network path.

DETAILED DESCRIPTION

Figure 1:
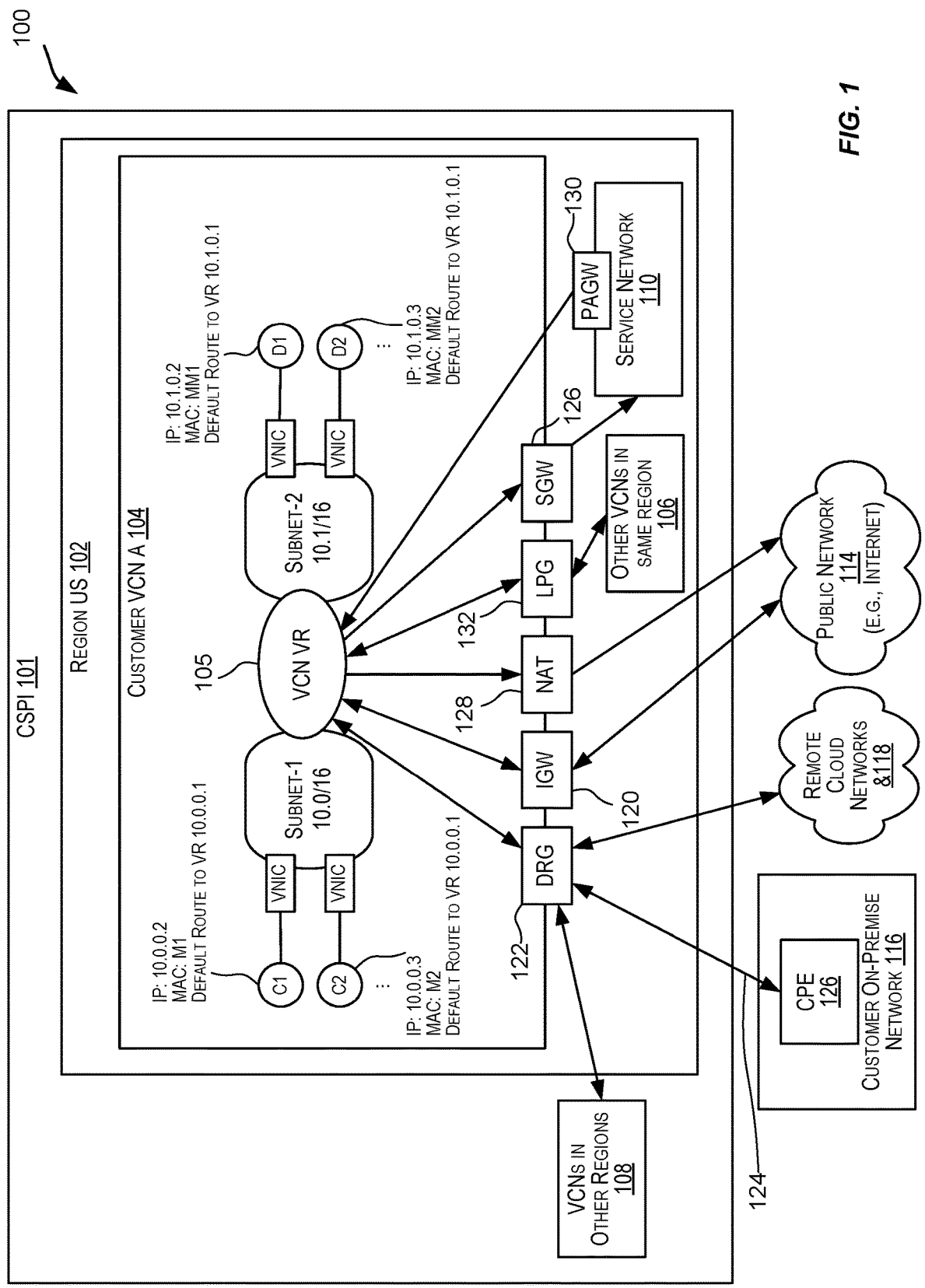
FIG. 1 is a high level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Example Virtual Networking Architecture

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN-IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's virtual cloud network (VCN). Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that represents or maps to multiple real IP addresses. A virtual IP address provides a 1-to-many mapping between the virtual IP address and multiple real IP addresses. For example, a load balancer may user a VIP to map to or represent multiple server, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general, a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 11, 12, 13, and 14 (see references 1116, 1216, 1316, and 1416) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 11, 12, 13, and 15, and are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a Media access control address (MAC address). For example, in FIG. 1, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 11, 12, 13, and 14 (for example, gateways referenced by reference numbers 1134, 1136, 1138, 1234, 1236, 1238, 1334, 1336, 1338, 1434, 1436, and 1438) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's FastConnect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 1120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
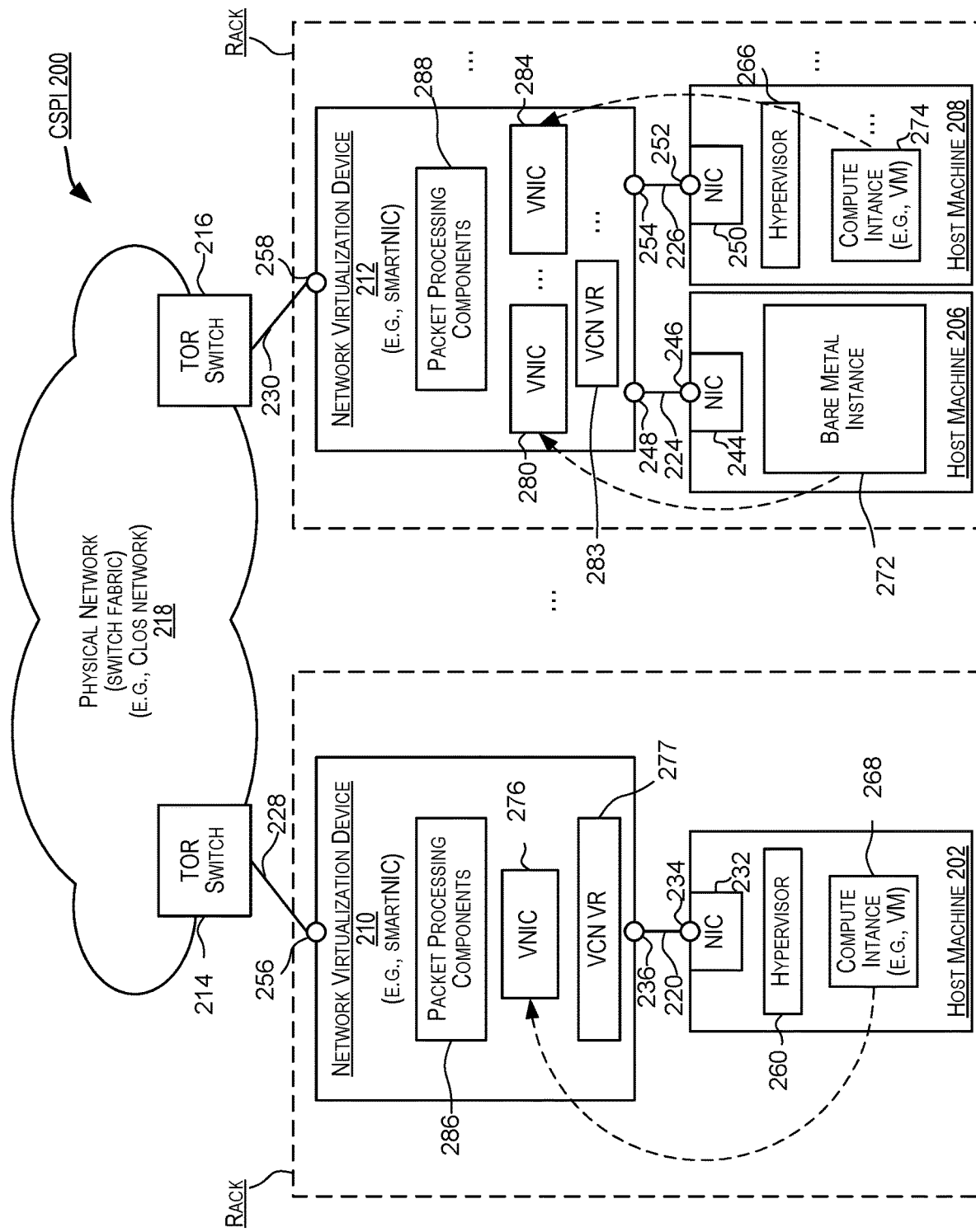
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP.

Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
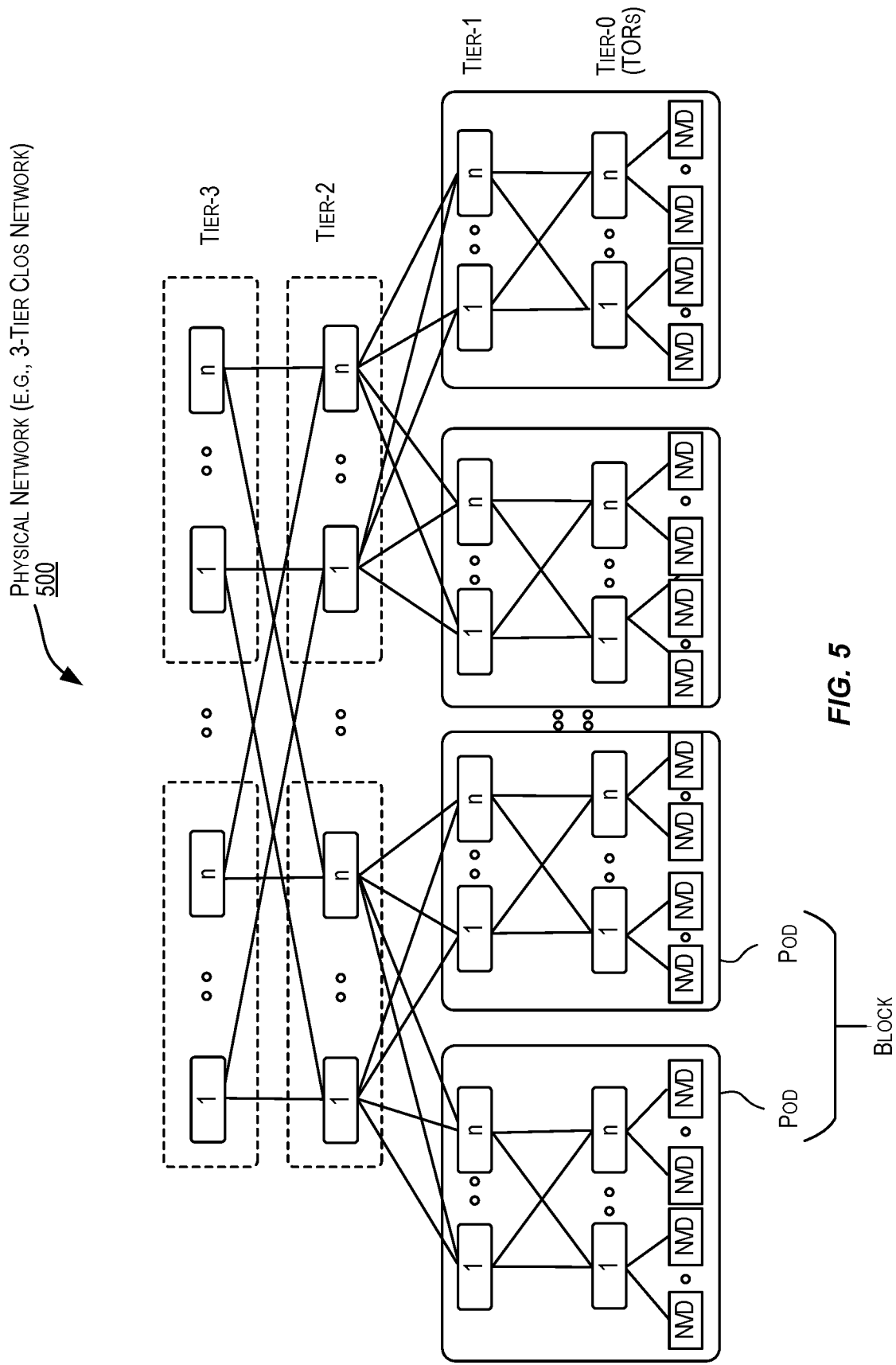
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
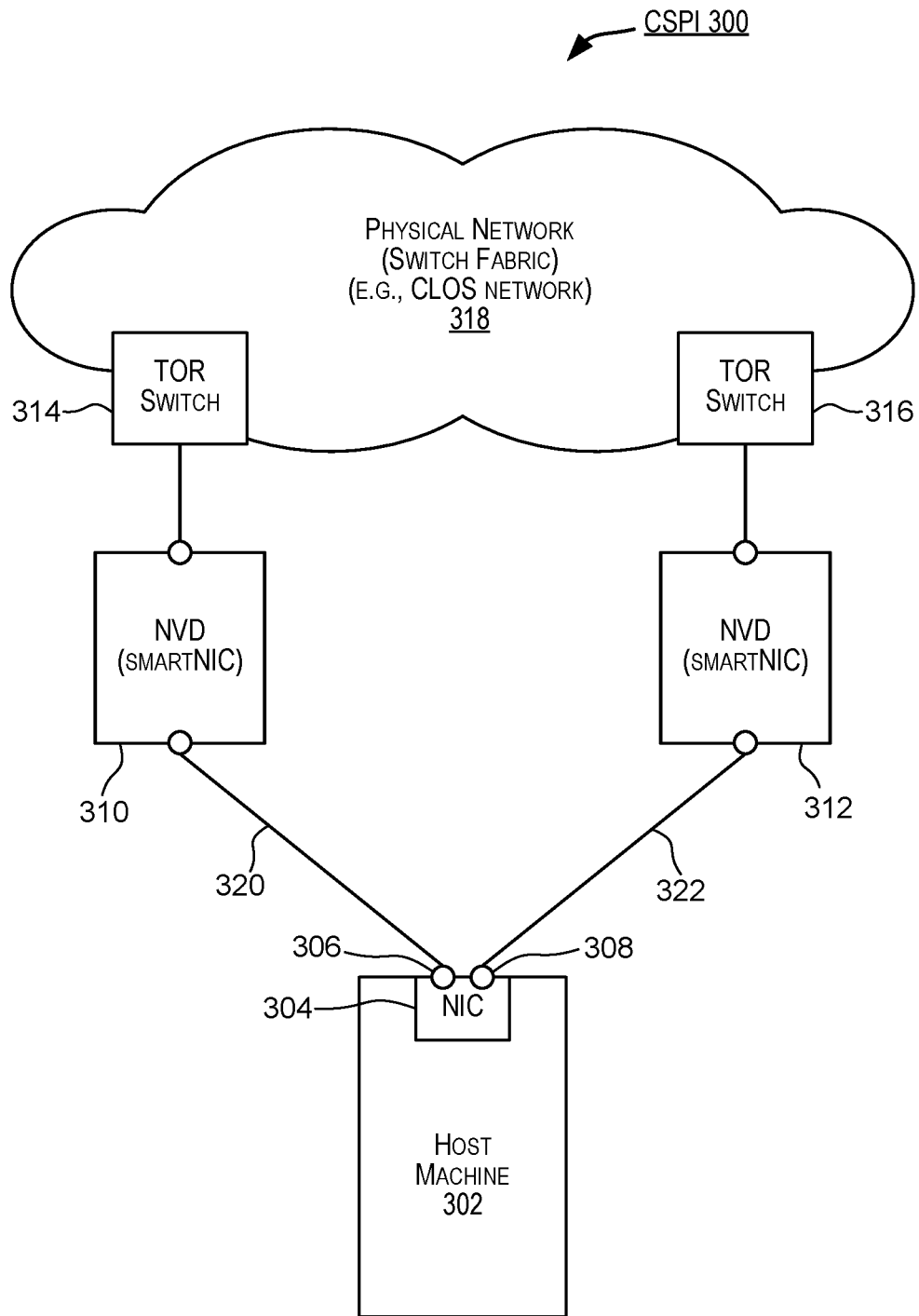
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 11, 12, 13, and 14 (see references 1116, 1216, 1316, and 1416) and described below. Examples of a VCN Data Plane are depicted in FIGS. 11, 12, 13, and 14 (see references 1118, 1218, 1318, and 1418) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
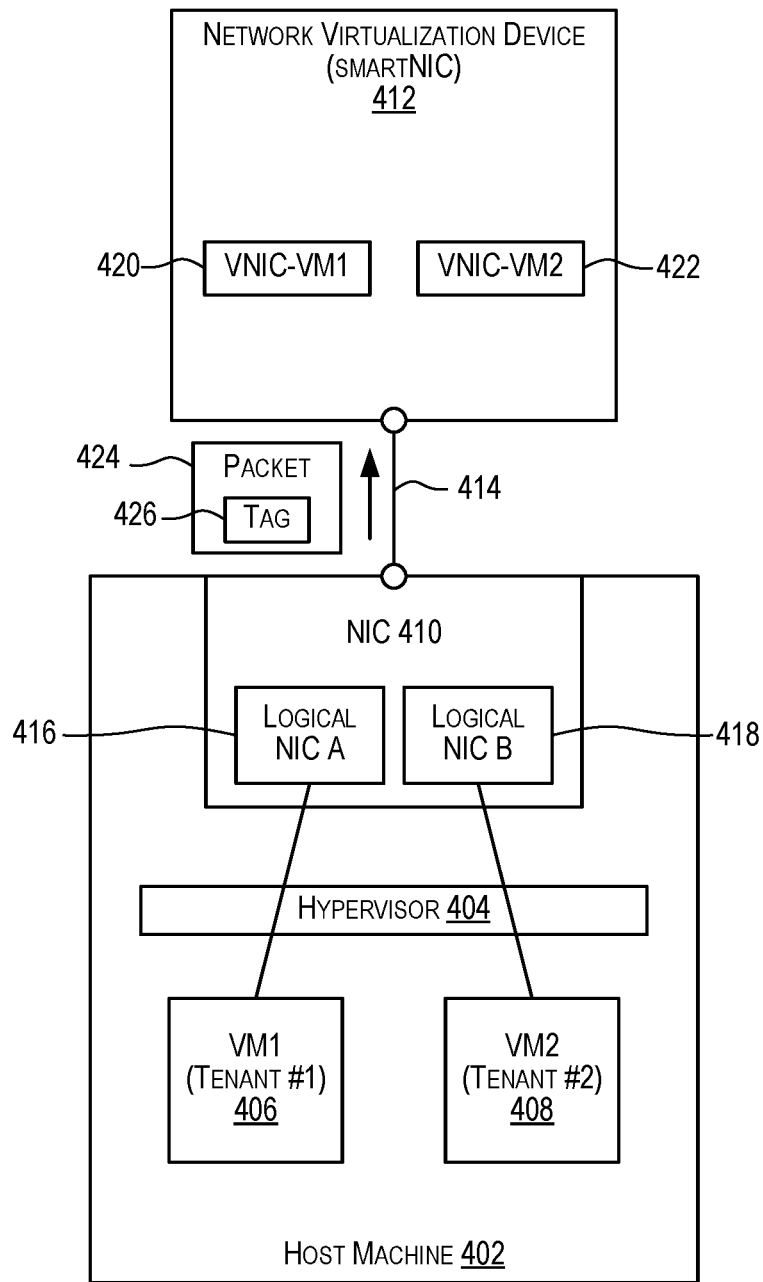
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multitenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION][.FUTURE USE].<UNIQUE ID> where, ocid1: The literal string indicating the version of the CID;

resource type: The type of resource (for example, instance, volume, VCN, subnet, user, group, and so on);

realm: The realm the resource is in. Example values are "c1" for the commercial realm, "c2" for the Government Cloud realm, or "c3" for the Federal Government Cloud realm, etc. Each realm may have its own domain name;

region: The region the resource is in. If the region is not applicable to the resource, this part might be blank;

future use: Reserved for future use.

unique ID: The unique portion of the ID. The format may vary depending on the type of resource or service.

Network Bonding and Automated Failover

A compute instance or other resources hosted on a CSPI may be accessible, and may access other computer instances or devices via an NVD such as a SmartNIC. The NVD may contain a VNIC assigned to the compute instance. The VNIC forms a virtual port to the VCN for the compute instance. However, in the event that this NVD fails or communication with the NVD is interrupted, the ability of the compute instance to communicate with other compute instances or devices on the VCN is impaired, and specifically is stopped. Further, it can be very difficult to quickly detect the failure of this NVD and even more challenging to quickly failover routing and communications to another NVD. This can result in interruptions in processing and/or the inability to access resources and services contained in a VCN.

For example, Cloud Overlay Networks are virtualized and implemented on top of an Layer-3 underlying physical network. Network Port bonding is a Layer-2 network concept and relies on physical link state of the ports to change the active/passive interface roles based on failures of network switches, cables, NIC interfaces. But these physical Links will remain active even if there are upstream L3 network path failures upstream and hence needs a different approach to provide similar functionality on the L3 networks.

Aspects of the present disclosure relate to the forming of a network path bond to thereby create bonded network paths connecting the compute instance to the VCN. Network bonding provides an Ethernet Link bonding solution over Overlay Cloud Layer-2 or Layer-3 networks built over a Layer-3 physical (underlay) network.

Network bonding on a host machine allows the kernel to present a single logical interface for two physical connections to two separate physical network device (switches or routers). Each of these connections can have a network path in the overlaid virtual network. For the normal course of operation, only one of these two network paths is used for forwarding and receiving the traffic. Specifically, a hypervisor can be used to detect failures at a media link interface, to detect the failure an active network path, and to failover to the backup network path, also referred to herein as standby network path. This network path state detection and failure is done completely transparent of the VMs and application layer services. This provides High Availability without the knowledge or participation of the customer VM. These bonding techniques help to reduce the number of single points of failure.

This bond/bonds/physical bond can, in some embodiments, connect a single compute instance to a VCN, and in some embodiments, can connect a plurality of compute instances to one or several VCNs. The creating of this bond can include, for example instance, identifying a plurality of NVDs via which the computer instance will access the VCN. A set of VNICs can be formed, the set of VNICs having one VNIC on each of the plurality of NVDs. These VNICs can, in some embodiments, be MAC learning VNICs, which can learn one or several MAC address through communications. In some embodiments, the VNICs can learn in MAC address of the compute instance to which they are coupled.

An IP address of the compute instance can be applied to the VNICs, such that each of the VNICs has the same applied IP address. The combination of an NVD and a VNIC having the applied IP address of a compute instance can form a network path for that compute instance. By creating a set of VNICs having the applied IP address of a compute instance, the set including one VNIC on each of a set of NVDs, a plurality of network paths coupled with the compute instance are formed. One of these network paths can be designated as an active network path, which designation can include the mapping of the applied IP address, which applied IP address is an overlay (aka logical) IP address, onto the physical IP address of the NVD underlaying that VNIC. This mapping can be performed in the control plane.

The health of the active network path can be monitored. In the event that the active network path fails, one of the other network paths can be automatically designate as the new, active network path. This can include remapping of the applied IP address of the VNIC in the NVD for designation as the new active network path onto the physical IP address of the NVD underlaying that VNIC. This mapping can be updated in the control plane, and the completion of this remapping can result in the automatic failover from the previous active network path to the new active network path. In embodiments disclosed herein, this failover can occur transparently to a client administrator.

Aspects of the present disclosure relate to the creation of a monitoring bond, also referred to herein as a "side channel bond." The monitoring bond can connect the NVDs of the bond to a monitoring application, also referred to herein as a "monitoring daemon" or as a "monitoring agent." The monitoring bond checks the health of the network periodically by checking the availability of VR on NVDs. If the VR on an active network path is not reachable the monitoring bond transparently fails over to a standby NVD path which becomes a new active network path.

Figure 6:
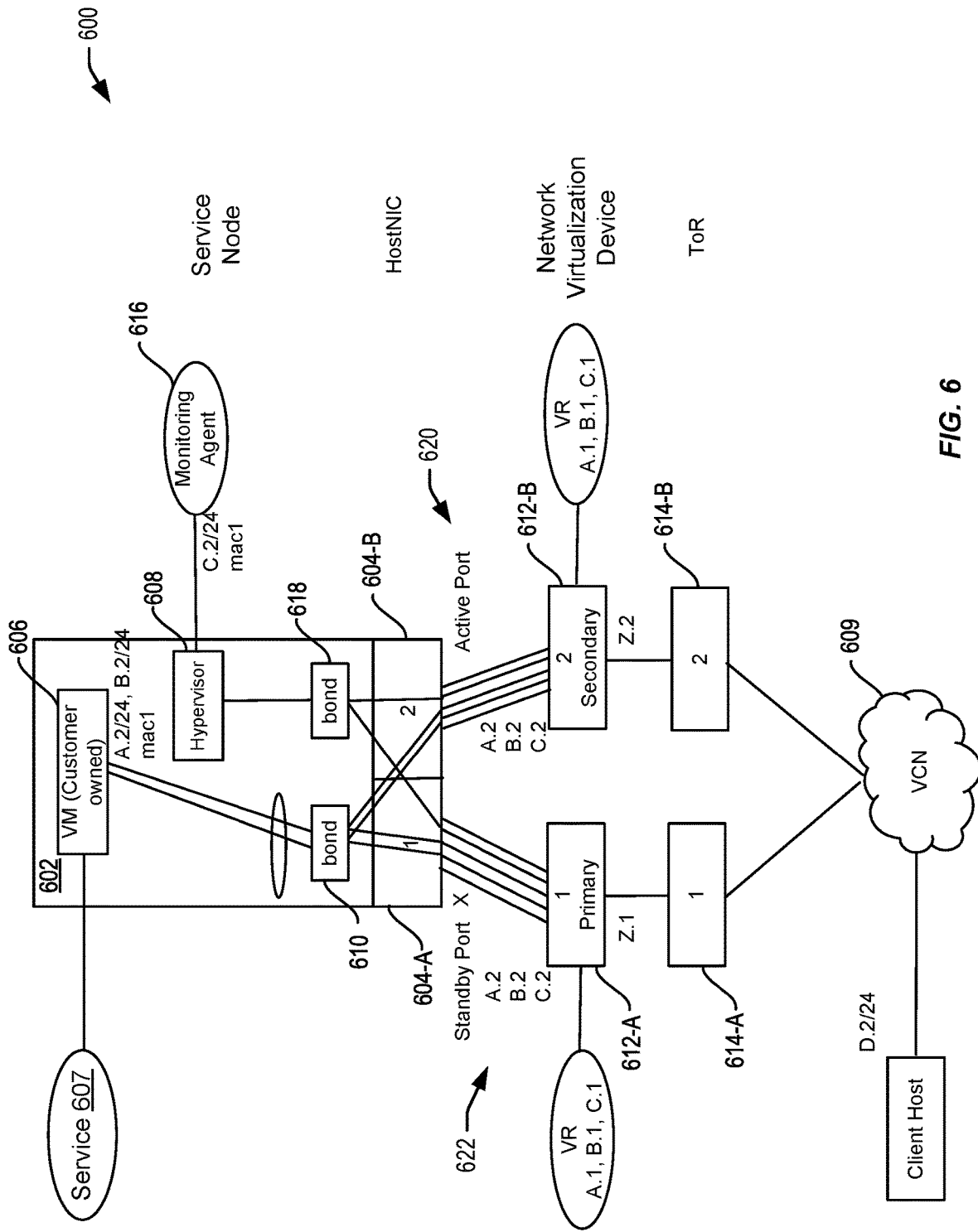
FIG. 6 is a schematic illustration of one embodiment of a system for network path bonding.

With reference now to FIG. 6, a schematic illustration of one embodiment of a system 600 for network path bonding is shown. The system 600 can include a host machine 602 that can include a plurality of ports 604, and specifically, a first port 604-A in the second port 604-B. The host machine 602 can include one or several compute instances 606 and a hypervisor 608, also referred to herein as VMM 608. In some embodiments, a compute instance 606 can comprise a virtual machine ("VM").

In some embodiments, the compute instance can be connected to a service 607. Service 607 can comprise, for example, a device, a network, a virtual network, a database, a memory, or the like. In some embodiments, service 607 can be accessed by one or several users via, for example, the compute instance 606.

The one or several compute instances 606 can be connected to a network such as VCN 609 via bond 610 coupling to the ports 604, NVDs 612, and switches 614, which can be Top of Rack (ToR) switches. In some embodiments, the bond 610 can comprise a L3 bond. In some embodiments, the multiple network paths between the VM 606 and the VCN 609 provide for high and/or robust availability to the service 607 via the VM 606. This high availability as achieved via the architecture and methods disclosed herein can decrease downtime in the event that one of the network paths fails and/or performs below some threshold level.

As seen, a monitoring agent 616 connects to the ports 600 for and the NVDs 612 via the hypervisor 608 and a monitoring bond 618. Specifically, the monitoring bond 618 can communicate with the network paths and/or with the NVDs 612, and can provide updates to the monitoring agent 616 based on these communications.

Specifically, the monitoring bond 618 can monitor the health of network paths such as, for example, first network path 620 and second network path 622. This can include performing a health-check via a communication to a NVD of a network path and/or to a TOR connected to the NVD of a network path. In some embodiments, this communication can be sent to, for example, a virtual router within the NVD 612 of a network path, or within the TOR connected to the NVD of a network path. In some embodiments, as a single NVD, and thus its single virtual router, can be associated with a plurality of network paths, or in other words, multiple VNICs can be active on that single NVD, the communication with that virtual router can provide information regarding the health of all of those network paths. In some embodiments, this communication can automatically triggers a response. This communication can comprise, for example, an ARping that can include by sending one or several link layer frames using the Address Resolution Protocol ("ARP") request method addressed to the virtual router. Based on whether a response to the ARping is received from the virtual router and/or based on an attribute of the received response to the ARping from the virtual router. The health-check could also be an ICMP ping or even a higher layer application health-check.

In some embodiments, the monitoring of the health of the network paths overlaid on a connection implicitly includes monitoring of the health of that physical connection. For example, if the physical connection, is down, the NVD and/or TOR will not receive the communication and/or will not send a response to the communication. Thus, in the event that the physical connection of the network path is down, the virtual router associated with one or several network paths will likewise be down, and will be identified as unhealthy.

Based on information received from the monitoring bond 618, the monitoring agent 616 can periodically check the health of the network path by checking the availability of VR on NVDs to determine when to failover from an active network path to a standby network path, also referred to herein as an inactive network path. Specifically, monitoring bond 618 can provide information to the monitoring agent 616, which information can be used by the monitoring agent 616 to determine when to failover. In some embodiments, for example, the monitoring agent 616 can failover and/or trigger failover when one of the network paths is failed, and in some embodiments, the monitoring agent 606 can failover and/or trigger failover when the network overlaying one or several of the network paths is performing below a desired level, such as, for example, below a desired bitrate.

In the embodiment of FIG. 6, the system 600 includes a first network path 620 extending from the bond 610 through the second port 604-B, and the second NVD 612-B. In some embodiments, this first network path 620 can include the second TOR 614-B. As seen in FIG. 6, this first network path 620 is designated as active.

As further seen in FIG. 6, the system includes a second network path 622 extending from the bond 610 through the first port 604-A, and the first NVD 612-A. In some embodiments, this second network path 622 can include the first TOR 614-A. As seen in FIG. 6, this second network path 622 is designated as standby.

Figure 7:
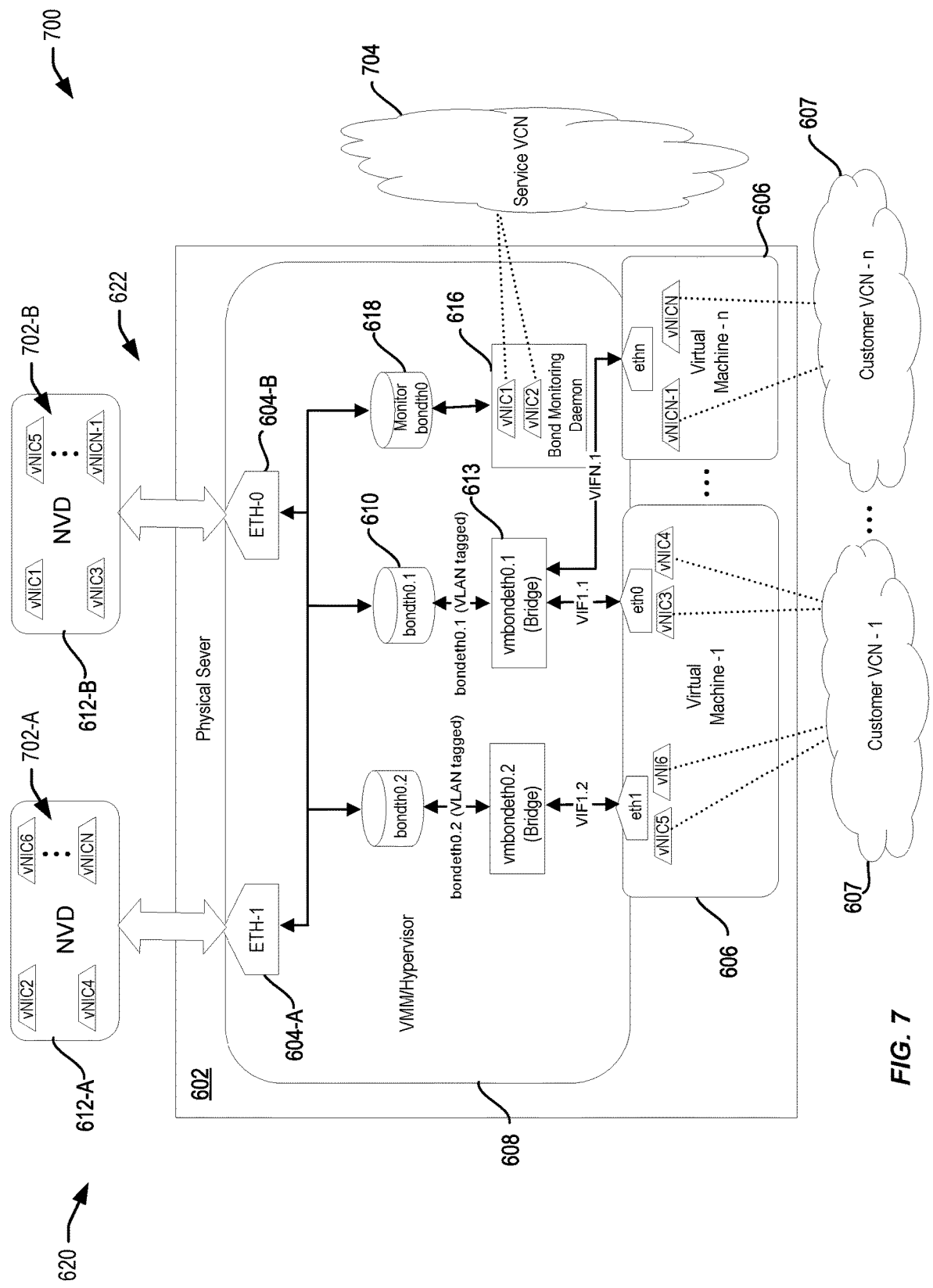
FIG. 7 is a depiction of another embodiment of a system for network path bonding.

With reference now to FIG. 7, a schematic illustration of another embodiment of a system 700 for network path bonding is shown. Like the system 600, the system 700 can include a host machine 602 comprising ports 604. The host machine 602 can generate and/or include one or several compute instances 606 and a hypervisor 608. As seen in FIG. 7, these compute instances 606 can include a first VM 606 through an Nth VM 606. In some embodiments, each of these VMs 606 can be connected to a service 607. In some embodiments, this can include multiple VMs 606 connecting to a single service 607, or multiple VMs one or several of each connecting to one of several services 607. Thus, for example, one or more VMs 606 could connect to a first service 607 and one or several VMs could connect with another service 607 up to, for example, an Nth service 607. In some embodiments, this service 607 can, and as depicted in FIG. 7, comprise a customer VCN.

The compute instance(s) 606 can be coupled via a bond 610 and a bridge 613 to NVDs 612. The bond 610 can take multiple interfaces and/or network paths and have them appear as a single, virtual interface. In some embodiments, a single bond 610 can connect multiple compute instances 606 and/or multiple services 607 to NVDs 612. In some embodiments, a single bridge 613 can connect multiple compute instances 606 and/or multiple services 607 to NVDs 612, and in some embodiments, each compute instance 606 and/or service 607 can connect via a unique bridge 613 to a bond, which can be shared with multiple compute instances 616 and/or services 607 to connect to NVDs 612. The bond 610 and bridge 613 can be embodied, in some embodiments, in software, and can, in some embodiments, be located in the hypervisor kernel.

A monitoring bond 618 can couple a monitoring agent 616 to ports 604 and to NVDs 612. In system 700, the monitoring agent 616 and the monitoring bond 618 are located inside of the hypervisor 608. The monitoring agent 616 and the monitoring bond 618 can be embodied, in some embodiments, in software, and can, in some embodiments, be located in the hypervisor kernel.

As depicted in FIG. 7, each NVD 612 can include a plurality of VNICs 702. In some embodiments, the creation of the bond 610 can include generating a set of VNICs. Each VNIC in this set of VNICs can be located on an NVD 612 such that each NVD 612 contains a unique VNIC 702. In embodiments in which the compute instance 606 is connected to a pair of NVDs 612, as shown in FIG. 7, the creation of the set of VNICs can include the creation of a pair of VNICs 702 including a first VNIC (labelled as VNIC4) on the first NVD 612-A and a second VNIC (labelled as VNIC3) on the second NVD 612-B.

In some embodiments in which multiple VMs 606 and/or services 607 share a bond 610, then the each of the NVDs 612 can include one or several VNICs for each of the multiple VMs 606 and/or services 607. These multiple compute instances 606 can be located on the same host machine 602, which can be a physical server, or can be located on different host machines 602. In some embodiments, a single VM 606 and/or service 607 may include multiple simultaneously active IP addresses, and thus can have multiple VNICs in each of the NVDs 612. In such an embodiment, each of the multiple VNICs will have one of the multiple simultaneously active IP addresses of the compute instance 606.

In some embodiments, the monitoring agent 616 can include a list of all of the VNICs 702 and/or of all of the IP addresses, which can be overlay IP addresses, of the VNICs 702 of each of the NVDs. In some embodiments in which one of the network paths is active, all of the VNICs on the NVD 702 of that network path are active. In some embodiments in which multiple VMs 606 and/or services 607 share a common bond 610, then the active NVD 612 for the VMs 606 will be the same. In other words, each of the VMs 606 will share a common, active NVD 612. In the event that a failure of overlay network associated with the previously active network path is determined, the monitoring agent 616 can retrieve the list of all VNICs and/or IP addresses affected by the failed network path and can failover for all of the identified VNICs and/or IP addresses.

The creation of monitoring bond 618 can include generating a set of monitoring VNICs. Each VNIC in this set of monitoring VNICs can be located on an NVD 612 such that each NVD 612 contains a unique monitoring VNIC. In some embodiments in which the compute instance 606 is connected to a pair of NVDs 612, as shown in FIG. 7, the creation of the set of monitoring VNICs can include the creation of a pair of monitoring VNICs including a first monitoring VNIC (labeled as VNIC2) on the first NVD 612-A and a second monitoring VNIC (labeled as VNIC1) on the second NVD 612-B. In some embodiments, the monitoring agent 616 can be connected to a service tenancy 704, also referred to herein as a service VCN 704.

Figure 8:
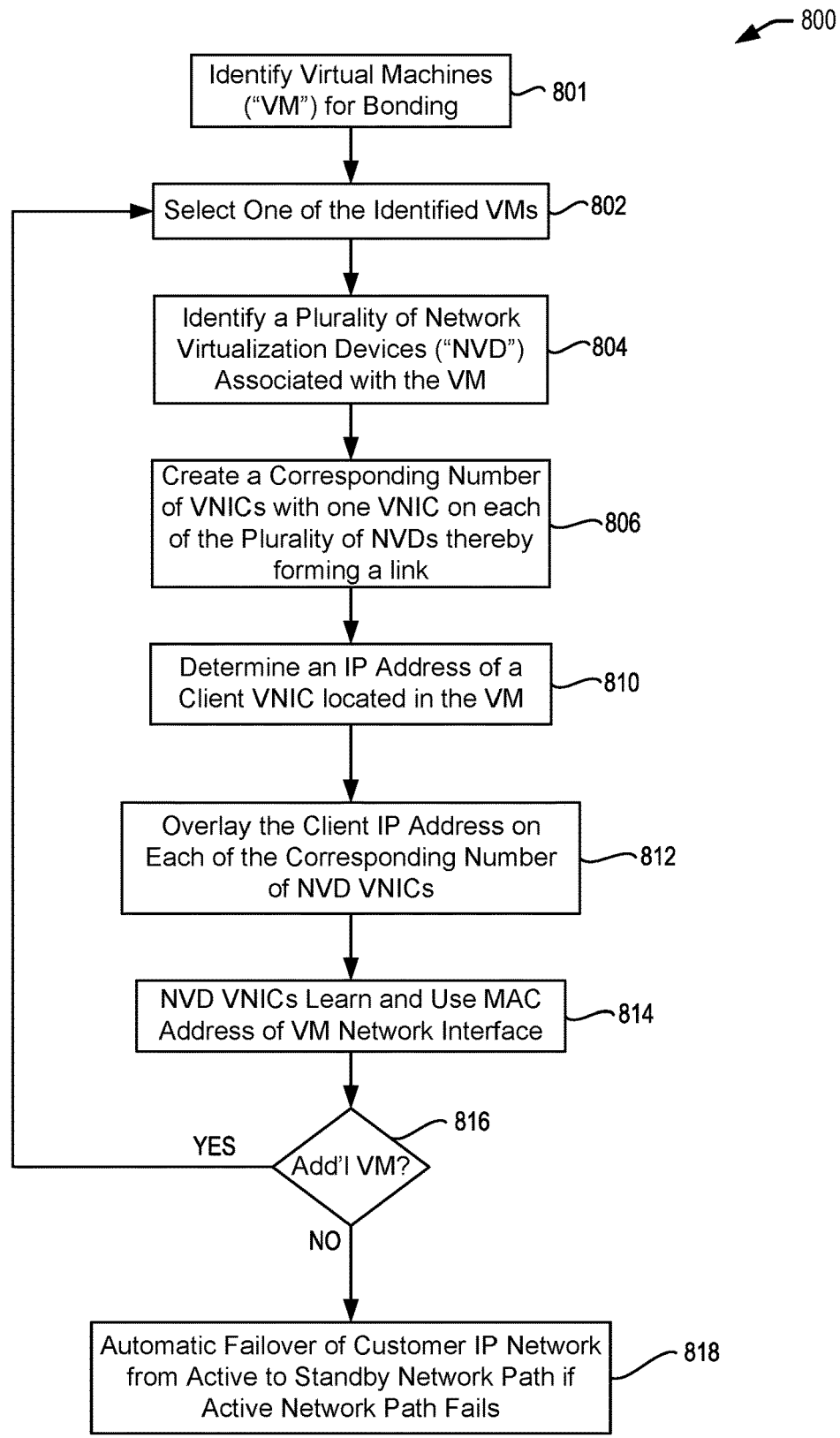
FIG. 8 is a flowchart illustrating one embodiment of a process for creation of a network path bond.

With reference now to FIG. 8, a flowchart illustrating one embodiment of a process 800 for creation of network path bond is shown. The process 800 can be performed by all or portions of system 600 and/or system 700. In some embodiments, the process 800 can be performed and/or directed by the hypervisor 608, and/or by one or several processors of or associated with the hypervisor 608. The process 800 begins at block 801 wherein one or several compute instances, one or more of which compute instances can be a virtual machine, are identified for bonding. In some embodiments, this identification can occur simultaneous with and/or subsequent to the creation of a compute instance. In some embodiments, the compute instances, which can include, for example, compute instance 606, can be identified by the hypervisor 608.

At block 802, one of the identified compute instances is selected. In some embodiments, the one of the identified compute instances can be selected and/or created by the hypervisor 608. At block 804 a plurality of NVDs associated with the compute instance are identified. In some embodiments, these NVDs, for example, NVDs 612, can be physically coupled to the host machine 602 in which the selected compute instance resides. In some embodiments, these NVDs can be used in creation of the bond.

At block 806 a set of VNICs are created. In some embodiments, the number of VNICs in the set of VNICs matches the number of NVDs identified for use in the bond. In some embodiments, the creating of the set of VNICs can include the creation of a new VNIC 702 on each of the NVDs 612 identified in block 804. In some embodiments, the creation of a new VNIC 702 on an NVD 612 can create a network path connecting the compute instance with the NVD containing the new VNIC. In some embodiments, each of these VNICs can include an IP address, a MAC address, and a VLAN designation. In some embodiments, each of these VNICs can comprise a MAC learning VNIC, which MAC learning VNIC can automatically learn a MAC address of the associated compute instance, and specifically the MAC address of the physical interface of that compute instance. In some embodiments, the learning VNIC can automatically learn the MAC address of the associated compute instance via communication with that compute instance. Thus, these MAC learning VNICs can learn the MAC address of the compute instance, and specifically of the physical interface of the compute instance to which the NVD containing the VNIC is linked.

At block 810 an IP address of the compute instance and/or associated with the compute instance is determined. In some embodiments, this can be an IP address of a client VNIC located in the compute instance. In some embodiments, this IP address associated with compute instance can be a private IP address identifying the compute instance within the VCN.

At block 812 the IP address of the compute instance is overlaid on each of the VNICs created in block 806. Through this overlaying, each of the VNICs created in block 806 has the IP address of the compute instance and/or the client VNIC IP address, and thus each of the VNICs created in block 806 shares a common IP address. This overlaying can include storing the overlay IP address in association with the VNIC.

At block 814 each of the VNICs created in block 806 learns and/or receives a MAC address of the compute instance. In some embodiments, this MAC address can be the MAC address provided to the compute instance by the hypervisor 608. In some embodiments, this MAC address can be the MAC address of the a network interface of the compute instance. In some embodiments, this can result in each of the VNICs created in block 806 learning and/or receiving the same MAC address. In some embodiments, this MAC address can be learned from the communications with the compute instance, and in some embodiments, this MAC address can be learned and/or received from a configuration file that can be, for example, stored and/or maintained by the hypervisor 608 and/or by the bond 610.

A decision step 816, it is determined if there are any additional compute instances for adding to the bond. In some embodiments, for example a plurality of compute instances can be connected to the NVDs via a single bond, and in some embodiments, a single compute instance can be connected to the NVDs via a single bond. If it is determined that there are additional compute instances, then the process 800 returns to block 802 and proceeds as outlined above to thereby add one or several of the additional compute instances to the bond.

In some embodiments, one of the network paths is designated as an active network path, or in other words, wherein one of the NVDs is designated as active. One of the network paths, or in other words one of the NVDs, can be designated as the active network path by the hypervisor 608, and in some embodiments, by the monitoring agent 616 in the hypervisor 608. The designation of one of the networks paths as an active network path can be performed at any point in process 800 including as a first step. In some embodiments, for example, one of the network paths, or in other words, one of the NVDs can be designated as active before identification of VMs for bonding, as currently represented in block 801, and in some embodiments, one of the NVDs can be designated as active simultaneous with or before creations of one or several of the VMs.

In some embodiments, the designation of one of the network paths, or in other words, one of the NVDs as active can include updating mapping in the control plane to map the overlay IP address of the compute instance on the VNIC of the NVD in the active network path onto the physical IP address of that NVD. Thus, mapping in the control plane can be updated to map the overlaid IP address onto the physical IP address of the NVD. This NVD can be in the active network path, and the overlay IP address can be overlay on the VNIC of the NVD. In some embodiments, this mapping can include updating one or several routing tables. These routing tables can, in some embodiments, be located on and/or accessible by, for example, one or several NVDs, switches, routers, or the like.

Returning again to decision step 816, if it is determined that there are no additional compute instances, then the process 800 proceeds to block 818 wherein the health of the active network path is monitored. If it is determined that the active network path, or in other words the network path fails a health-check, and/or if the active network path, or in other words the network path otherwise fails, then an automatic failover occurs. This can include identifying the previous active network path as inactive and designating a previous standby network path as the new active network path. In some embodiments, this can include remapping in the control plane of the VCN to couple the overlay IP address of the compute instance on the VNIC of the NVD in the previous standby network path to the physical IP address of that NVD. In other words, this can include coupling the physical IP address of the NVD in the new active network path to the overlay IP address, which overlay IP address is overlaid onto the VNIC of the NVD in the new active network path. This remapping can include updating one or several routing tables, which routing tables can be located on and/or be accessible to one or several NVDs, switches, routers, or the like.

Figure 9:
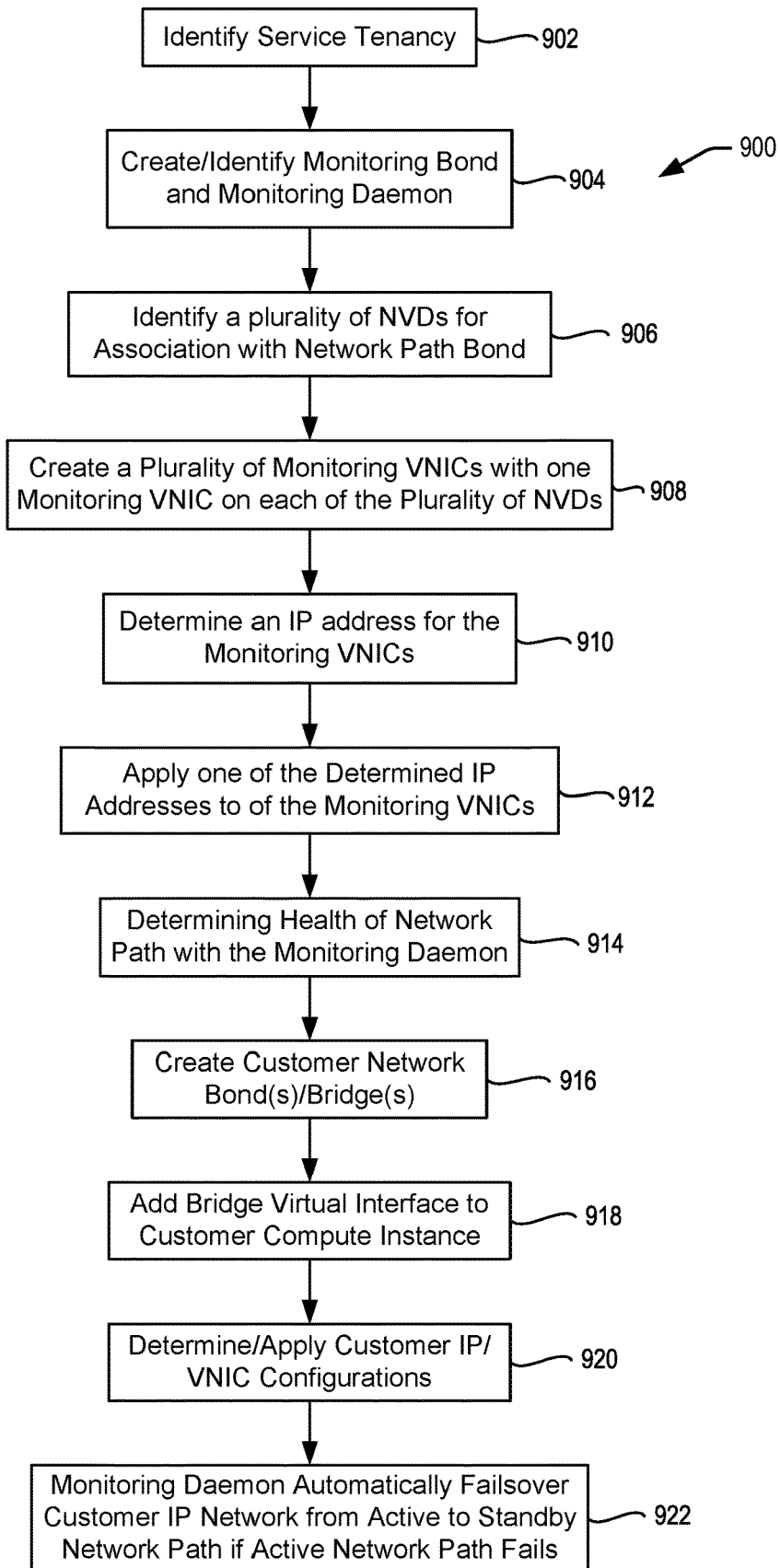
FIG. 9 is a flowchart illustrating one embodiment of a process for creating a monitoring bond and providing automatic failover.

With reference now to FIG. 9, a flowchart illustrating one embodiment of a process 900 for creating a monitoring bond and providing automatic failover is shown. The process 900 can be performed by all or portions of system 600 and/or system 700. In some embodiments, the process 900 can be performed by the hypervisor 608. In some embodiments, the process 900 can be performed by one or several processors located in, and/or associated with one or several components of system 600 and/or system 700. The process 900 begins at block 902, wherein a service tenancy is identified. In some embodiments, the service tenancy can comprise a administrative virtual cloud network such as, for example, service tenancy 704, for use in maintaining, monitoring, and/or managing one or several customer infrastructures like compute servers, storage servers, networking physical infrastructures, or the like.

At block 904 a monitoring bond 618 and/or monitoring daemon 616 are created and/or identified. The monitoring bond 618 and/or monitoring daemon 616 can, in some embodiments, be created by the hypervisor 608. The monitoring bond 618 and/or the monitoring daemon 616 can be created, in some embodiments, within the hypervisor 608.

At block 906 the plurality of NVDs for association with a network path bond 910 are identified. In some embodiments, the step of block 906 can include identifying a plurality of NVDs 702 coupled to a device, such as to the physical server 602. In some embodiments, the step of block 906 can include identifying a plurality of NVDs 702 coupled to a device, such as a physical server 602 and available for incorporation into a bond 610.

In some embodiments, one of the NVDs 702 can be identified and/or designated as active, thereby identifying and/or designating an active network path. This can include determining which of the NVDs identified in 906 is the active NVD, and/or which network path associated with an NVD identified in block 906 is the active network path. In some embodiments, this can include associating an indicator of active status with the active network path, which indicator can comprise, for example, a stored value. In some embodiments, identifying and/or designating one of the NVDs as active can likewise include identifying the others of the NVDs as inactive. In some embodiments, this can include associating an indicator of inactive status with the inactive NVD(s) and/or network path(s), which indicator can comprise, for example, a stored value. The one of the NVDs 702 can be identified and/or designated as active by, for example, the monitoring agent 616, and likewise, the one or several NVDs can be identified and/or designated as inactive by, for example, the monitoring agent 616. In some embodiments, this designation of NVDs as active or inactive can be performed as a part of the step of block 906.

At block 908, a set of monitoring VNICs are created. In some embodiments, the number of monitoring VNICs in the set of monitoring VNICs matches the number of NVDs identified in block 906 and that are associated with the network path bond. In some embodiments, the creating of the set of monitoring VNICs can include the creation of a new monitoring VNIC on each of the NVDs identified in block 906. In some embodiments, creating the set of monitoring VNICs can include creating a plurality of monitoring VNICs with one monitoring VNIC on each of the NVDs identified in block 906.

At block 910 an IP address for the monitoring VNICs is determined. In some embodiments, this IP address can be received from the service tenancy identified in block 902, and in some embodiments, this IP address can be determined and/or assigned by the monitoring agent 616.

At block 912 the IP address determined in block 910 is applied to the monitoring VNICs. Specifically, this can include applying the IP address determined in block 910 to each of the monitoring VNICs. Thus, in some embodiments, each of the monitoring VNICs can share a common IP address.

At block 914 the health of network paths, or in other words the health of network paths in the network path bond is monitored. In some embodiments, this specifically includes monitoring of the health of networks paths traversing the active network path in the network path bond, and in some embodiments this may include monitoring the health of both the active network path and of one or several standby network paths. This health can be monitored by the hypervisor 608, and specifically by the monitoring agent 616. In some embodiments, the monitoring of the health of a network path can include monitoring the responsiveness and/or availability of the virtual router in the NVD of that network path. The monitoring of this health (aka the health-check or a keepalive) can be as simple as an ICMP ping, an ARPing, a traceroute or a higher layer application level health-check. In some embodiments, for example, the virtual router in the NVD of a network path will response to such a communication, and the receipt of a response to that communication can indicate that the virtual router is responsive, and thus that the network path is healthy. This health check can be continuously or periodically starting at the time of the creation of the monitoring agent 616.

At block 916, the bond 610, also referred to herein as the customer network bond and/or bridge is created. In some embodiments, this can include the creation of a single bond, or the creation of multiple bonds. In some embodiments, this bond 610 can connect at least one compute instance an a plurality of NVDs. In some embodiments, this bond 610 can connect a physical server 602 to a plurality of NVDs 702 via ports 604 of the physical server 602.

At block 918, a virtual interface of the bond and/or bridge is added to the compute instance. This virtual interface, shown in FIG. 7 as VIF1.1, VIF1.2, and VIFN.1 can provide the compute instance access to the bond 610, and specifically can provide access to the NVD 702. At block 920, customer IP and/or VNIC configurations are applied. In some embodiments, this can include some or all of the steps shown in process 800 of FIG. 8. In some embodiments, the monitoring agent gathers 616 aggregates all of the IP addresses of the VNICs created on the NVDs as part of the step of block 920, which IP addresses can be used by the monitoring agent 616 during failover.

At any point during process 900, if it is determined that the active network path fails a health-check, and/or if the active network path otherwise fails, then, as indicated in block 922, an automatic failover occurs. In some embodiments, this failover can be performed according to some or all of the steps of process 1000 discussed with respect to FIG. 10, below.

In some embodiments, the active network path can be identified as failed when the active network path no longer can communicate, in other words, can no longer send and/or receive information, and/or when the performance of the active network path drops below a threshold level. In some embodiments, for example, the active network path can be identified as failed when the virtual router does not respond to a communication. In some embodiments, this failure of the active network path is determined based on receipt of no response to the health check, and specifically no response received to one or several communications to the active network path. In some embodiments, the active network path drops below the threshold level when the active network path communicates, including sending and/or receiving data, below a desired bitrate. Thus, in some embodiments, this threshold can identify a minimum communication speed and/or a minimum data transmission speed.

Automatic failover can include identifying the previous active network path as inactive and designating a previous standby network path as the new active network path. In some embodiments, this can include moving IP addresses to the VNICS on the new active NVD. In some embodiments, this can include remapping in the control plane of the VCN to couple the overlay IP address of the compute instance on the VNIC of the NVD in the previous standby network path, or in other words of the NVD in the new active network path onto the physical IP address of that NVD. This mapping can include updating one or several routing tables, which routing tables can be located on and/or be accessible to one or several NVDs, switches, routers, or the like. In some embodiments, for example, the hypervisor 608, and specifically the monitoring agent 616 can determine that the active network path has failed a health check. The monitoring agent 616 can, based on the failed health check, update mapping such that a previous standby network path becomes designated as the active network path. In some embodiments, the updating of the mapping can include the monitoring agent 616 notifying the control plane of the failed health check of the network path, and the control plane updating mapping such that the active network path is no longer designated as active and such that a previous standby network path becomes designated as the active network path.

Figure 10:
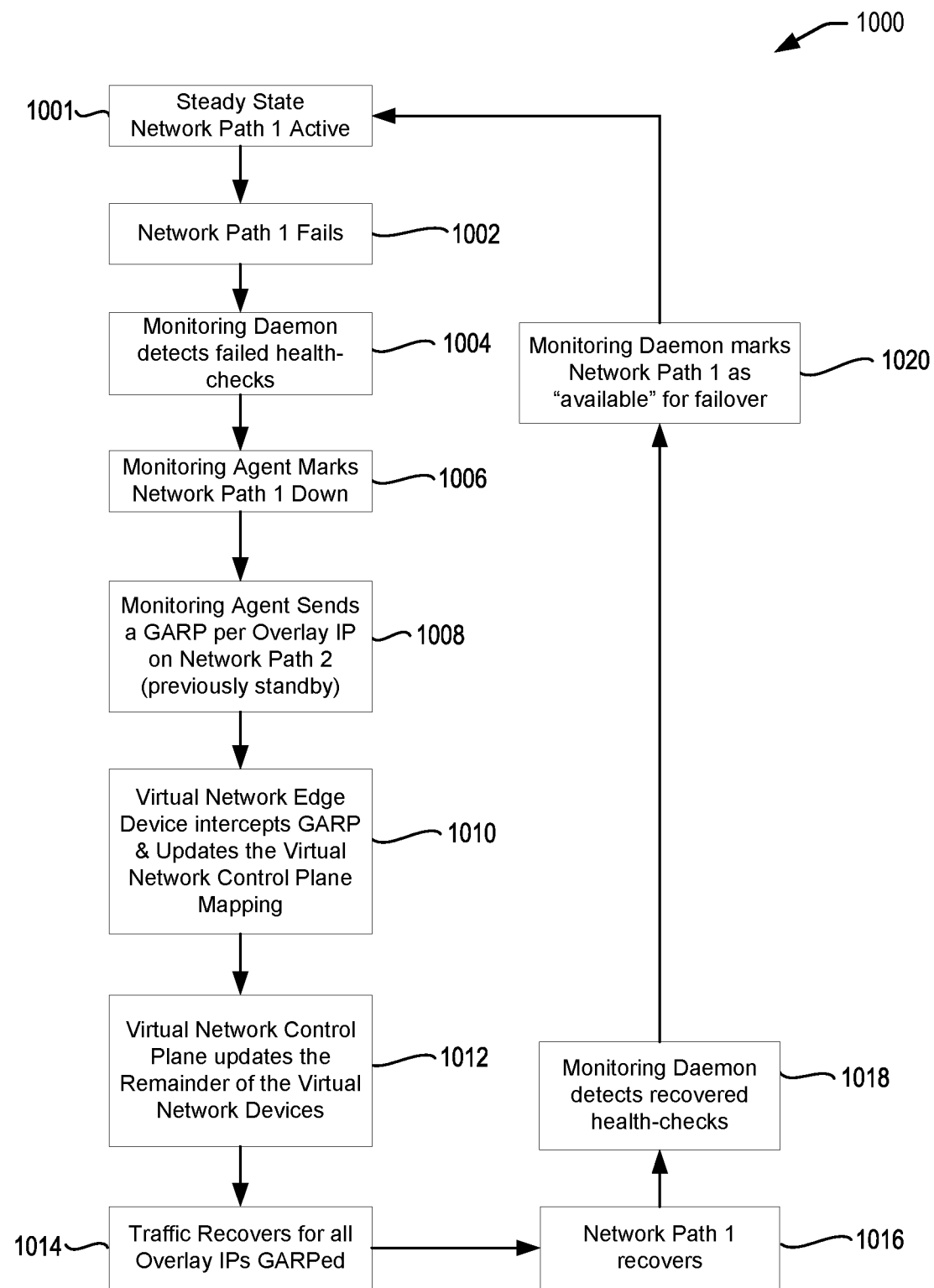
FIG. 10 is a flowchart illustrating one embodiment of a process for health monitoring and automatic failover.

With reference now to FIG. 10, a flowchart illustrating one embodiment of a process 1000 for health monitoring and automatic failover is shown. The process 1000 can be performed by one or both of systems 600 and 700 and/or can be wholly or partially performed by the monitoring agent 616. The process 1000 begins at block 1001, wherein a first network path is designated as the active network path. At block 1002 the first network path fails, which failure is detected as indicated in block 1004 by the monitoring agent 616 via the first network path failing a health check. In some embodiments, the monitoring agent 616 can perform the health-check via a communication to the NVD of a network path or to the TOR connected to the NVD of a network path, which communication automatically triggers a response. In some embodiments, this communication can be to a virtual router that can be in the NVD or can be in the TOR. This communication can comprise, for example, an ARping by sending one or several link layer frames using the Address Resolution Protocol ("ARP") request method addressed to the virtual router. Based on whether a response to the ARping is received from the virtual router and/or based on an attribute of the received response to the ARping from the virtual router.

At block 1006 the monitoring agent 616 indicates that the first network path is down. At block 1008, the monitoring agent 616 sends a registration protocol message per the overlay IP address on the second network path, which second network path was previously a standby network path. This can include, for example, the monitoring agent 616 sending a registration protocol message on behalf of each overlay IP address of VNICs associated with the previous active NVD to the previous standby, and now active NVD. In some embodiments, this registration protocol message can be a Gratuitous ARP (GARP) message.

At block 1010 a virtual network edge device, which virtual network edge device can be the NVD of the previous standby network path intercepts the registration protocol message(s), which registration protocol message can be GARP message(s), and updates the control plane mapping. Thus, in some embodiments, the data plane of the virtual network intercepts the registration protocol message(s) sent by the hypervisor 608. In some embodiments, this registration protocol message(s) can include a message for each of the overlay IP addresses of the VNICs that are failing over.

In some embodiments, the virtual network edge device, which can be, for example, the NVD of the previous standby network path, which NVD can be, for example, a smartNIC, can update the virtual network control plane mapping based on this intercepted registration protocol message(s). In some embodiments, this can include updating the mapping such that the overlay IP address is mapped onto the VNIC on the NVD of the second network path.

At block 1012 the virtual network control plane updates the virtual network data plane, and specifically the other virtual network devices. In some embodiments, this can include enabling devices operating in the data plane to affect routing of packets based on the updated mapping in the control plane. In some embodiments this can further include distributing information relating to the updated mapping to devices operating in the data plane such as, for example, one or several NVDs, switches, routers, or the like, which devices in the data plane can then update the routing tables based on the updated mapping of block 1010. In some embodiments, this update can be performed by the sending of one or several GARPs.

At block 1014 traffic recovers for all overlay IP address affected by the failover, or in other words, for all overlay IP addresses of the VNICs of the previous standby network path, or in other words for all overlay IP addresses of the VNICs of the new active network path. At block 1016, network path 1 recovers, and at block 1018, the monitoring agent 616 detects that network path 1, which was the previous active network path, has recovered. In other words, the monitoring agent 616 determines that network path 1 has passed its health check. At block 1020, the monitoring agent 616 marks network path 1 as available for failover, or in other words, identifies network path 1 as a standby network path. The process 1000 continues with block 1001, but now the new active network path is network path 2 and the new standby network path is network path 1.

Example Implementation

Figure 11:
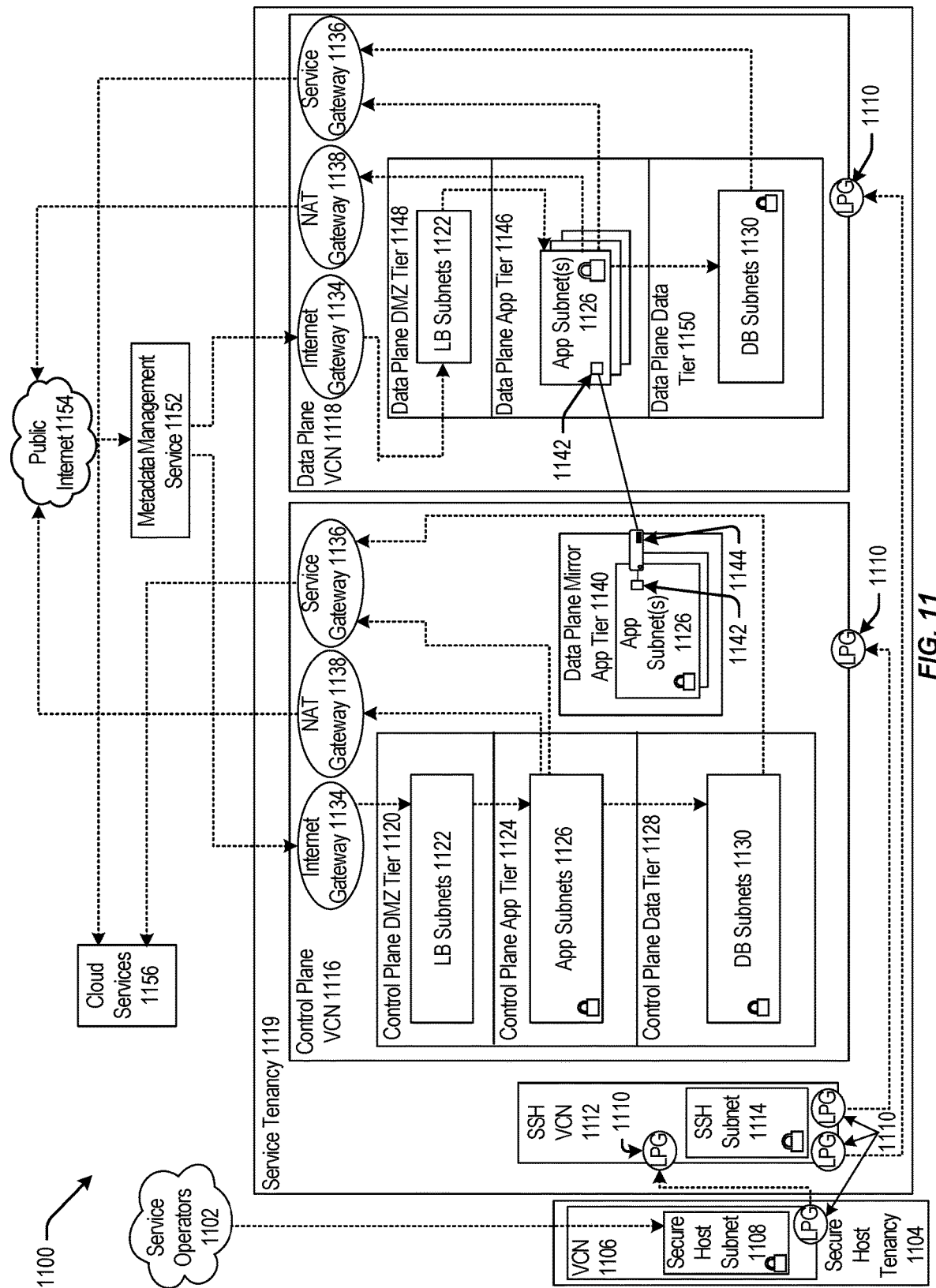
FIG. 11 is a block diagram illustrating one pattern for implementing a cloud infrastructure as a service system, according to at least one embodiment.

FIG. 11 is a block diagram 1100 illustrating an example pattern of an IaaS architecture, according to at least one embodiment. Service operators 1102 can be communicatively coupled to a secure host tenancy 1104 that can include a virtual cloud network (VCN) 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway (LPG) 1110 that can be communicatively coupled to a secure shell (SSH) VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone (DMZ) tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer (LB) subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively couple to cloud services 1156.

In some examples, the service gateway 1136 of the control plane VCN 1116 or of the data plan VCN 1118 can make application programming interface (API) calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete (CRUD) operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 12:
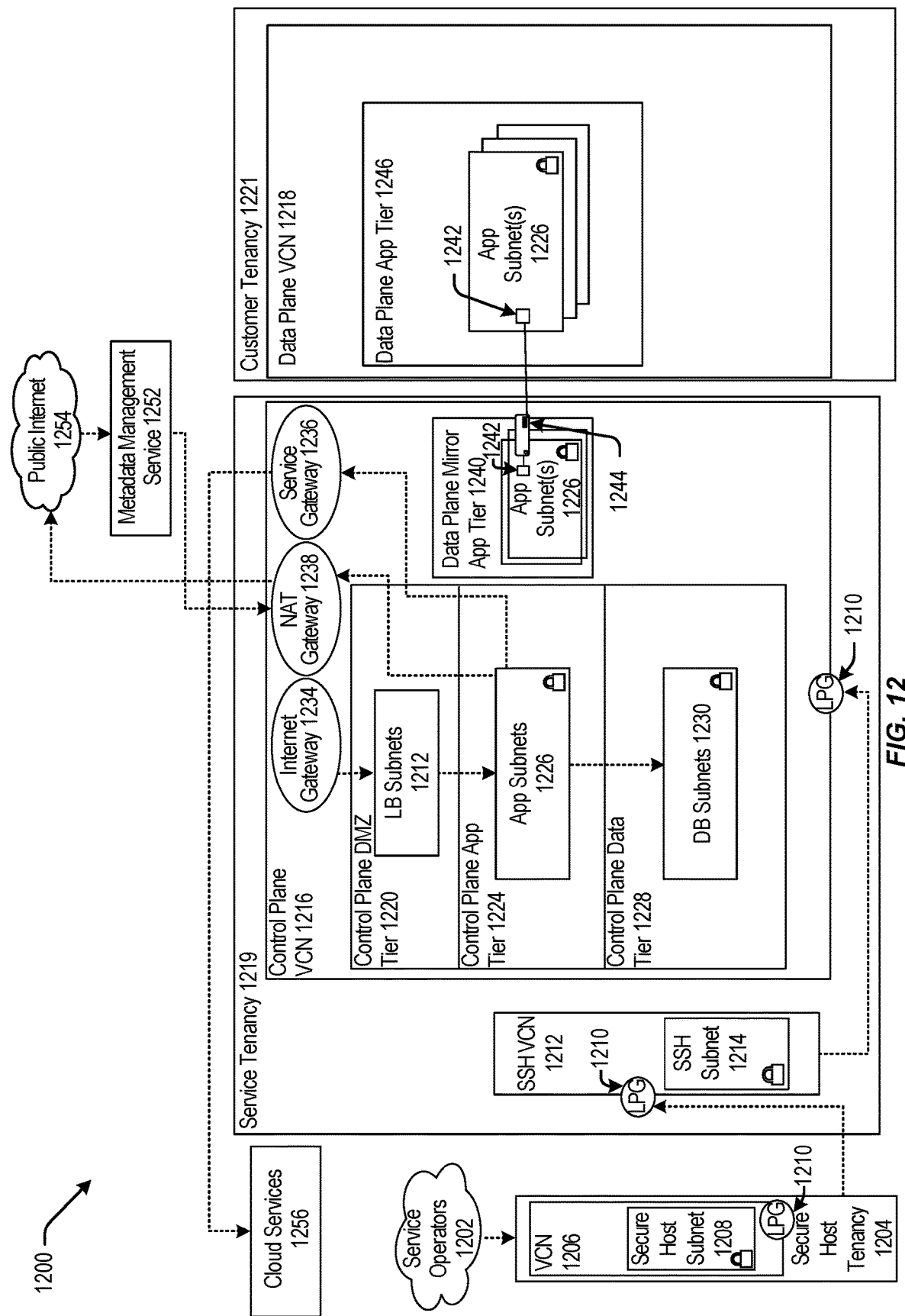
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 1102 of FIG. 11) can be communicatively coupled to a secure host tenancy 1204 (e.g. the secure host tenancy 1104 of FIG. 11) that can include a virtual cloud network (VCN) 1206 (e.g. the VCN 1106 of FIG. 11) and a secure host subnet 1208 (e.g. the secure host subnet 1108 of FIG. 11). The VCN 1206 can include a local peering gateway (LPG) 1210 (e.g. the LPG 1110 of FIG. 11) that can be communicatively coupled to a secure shell (SSH) VCN 1212 (e.g. the SSH VCN 1112 of FIG. 11) via an LPG 1110 contained in the SSH VCN 1212. The SSH VCN 1212 can include an SSH subnet 1214 (e.g. the SSH subnet 1114 of FIG. 11), and the SSH VCN 1212 can be communicatively coupled to a control plane VCN 1216 (e.g. the control plane VCN 1116 of FIG. 11) via an LPG 1210 contained in the control plane VCN 1216. The control plane VCN 1216 can be contained in a service tenancy 1219 (e.g. the service tenancy 1119 of FIG. 11), and the data plane VCN 1218 (e.g. the data plane VCN 1118 of FIG. 11) can be contained in a customer tenancy 1221 that may be owned or operated by users, or customers, of the system.

The control plane VCN 1216 can include a control plane DMZ tier 1220 (e.g. the control plane DMZ tier 1120 of FIG. 11) that can include LB subnet(s) 1222 (e.g. LB subnet(s) 1122 of FIG. 11), a control plane app tier 1224 (e.g. the control plane app tier 1124 of FIG. 11) that can include app subnet(s) 1226 (e.g. app subnet(s) 1126 of FIG. 11), a control plane data tier 1228 (e.g. the control plane data tier 1128 of FIG. 11) that can include database (DB) subnet(s) 1230 (e.g. similar to DB subnet(s) 1130 of FIG. 11). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134 of FIG. 11) that can be contained in the control plane VCN 1216, and the app subnet(s) 1226 can be communicatively coupled to the DB subnet(s) 1230 contained in the control plane data tier 1228 and a service gateway 1236 (e.g. the service gateway of FIG. 11) and a network address translation (NAT) gateway 1238 (e.g. the NAT gateway 1138 of FIG. 11). The control plane VCN 1216 can include the service gateway 1236 and the NAT gateway 1238.

The control plane VCN 1216 can include a data plane mirror app tier 1240 (e.g. the data plane mirror app tier 1140 of FIG. 11) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144 of FIG. 11). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146 of FIG. 11) via the VNIC 1242 contained in the data plane mirror app tier 1240 and the VNIC 1242 contained in the data plan app tier 1246.

The Internet gateway 1234 contained in the control plane VCN 1216 can be communicatively coupled to a metadata management service 1252 (e.g. the metadata management service 1152 of FIG. 11) that can be communicatively coupled to public Internet 1254 (e.g. public Internet 1154 of FIG. 11). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156 of FIG. 11).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources, that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218 but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 12," may be located in Region 1 and in "Region 2." If a call to Deployment 11 is made by the service gateway 1236 contained in the control plane VCN 1216 located in Region 1, the call may be transmitted to Deployment 11 in Region 1. In this example, the control plane VCN 1216, or Deployment 11 in Region 1, may not be communicatively coupled to, or otherwise in communication with, Deployment 11 in Region 2.

Figure 13:
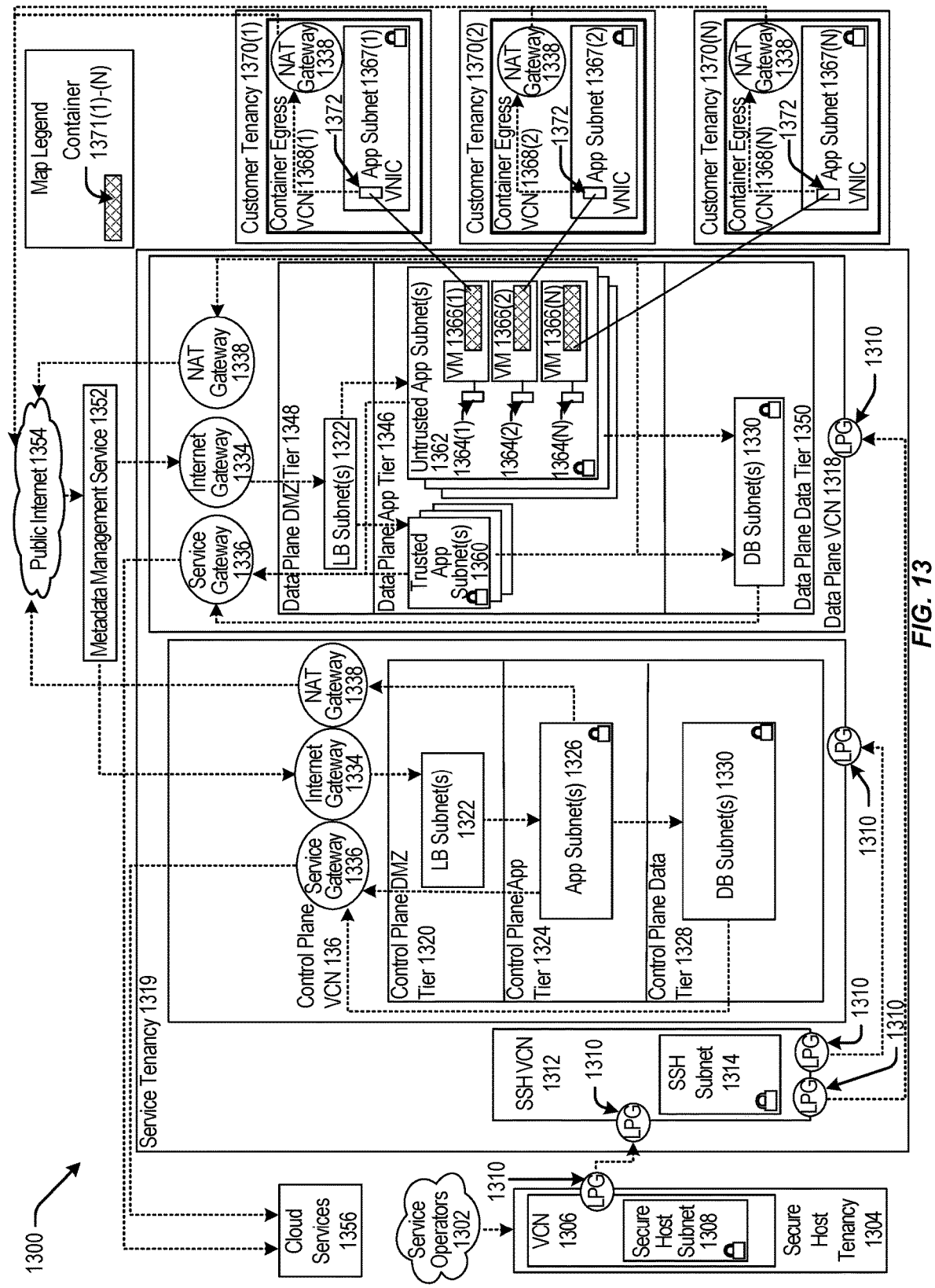
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1102 of FIG. 11) can be communicatively coupled to a secure host tenancy 1304 (e.g. the secure host tenancy 1104 of FIG. 11) that can include a virtual cloud network (VCN) 1306 (e.g. the VCN 1106 of FIG. 11) and a secure host subnet 1308 (e.g. the secure host subnet 1108 of FIG. 11). The VCN 1306 can include an LPG 1310 (e.g. the LPG 1110 of FIG. 11) that can be communicatively coupled to an SSH VCN 1311 (e.g. the SSH VCN 1112 of FIG. 11) via an LPG 1310 contained in the SSH VCN 1312. The SSH VCN 1312 can include an SSH subnet 1314 (e.g. the SSH subnet 1114 of FIG. 11), and the SSH VCN 1312 can be communicatively coupled to a control plane VCN 1316 (e.g. the control plane VCN 1116 of FIG. 11) via an LPG 1310 contained in the control plane VCN 1316 and to a data plane VCN 1318 (e.g. the data plane 1118 of FIG. 11) via an LPG 1310 contained in the data plane VCN 1318. The control plane VCN 1316 and the data plane VCN 1318 can be contained in a service tenancy 1319 (e.g. the service tenancy 1119 of FIG. 11).

The control plane VCN 1316 can include a control plane DMZ tier 1320 (e.g. the control plane DMZ tier 1120 of FIG. 11) that can include load balancer (LB) subnet(s) 1322 (e.g. LB subnet(s) 1122 of FIG. 11), a control plane app tier 1324 (e.g. the control plane app tier 1124 of FIG. 11) that can include app subnet(s) 1326 (e.g. similar to app subnet(s) 1126 of FIG. 11), a control plane data tier 1328 (e.g. the control plane data tier 1128 of FIG. 11) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1134 of FIG. 11) that can be contained in the control plane VCN 1316, and the app subnet(s) 1326 can be communicatively coupled to the DB subnet(s) 1330 contained in the control plane data tier 1328 and to a service gateway 1336 (e.g. the service gateway of FIG. 11) and a network address translation (NAT) gateway 1338 (e.g. the NAT gateway 1138 of FIG. 11). The control plane VCN 1316 can include the service gateway 1336 and the NAT gateway 1338.

The data plane VCN 1318 can include a data plane app tier 1346 (e.g. the data plane app tier 1146 of FIG. 11), a data plane DMZ tier 1348 (e.g. the data plane DMZ tier 1148 of FIG. 11), and a data plane data tier 1350 (e.g. the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154 of FIG. 11).

The Internet gateway 1334 contained in the control plane VCN 1316 and contained in the data plane VCN 1318 can be communicatively coupled to a metadata management service 1352 (e.g. the metadata management system 1152 of FIG. 11) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 14:
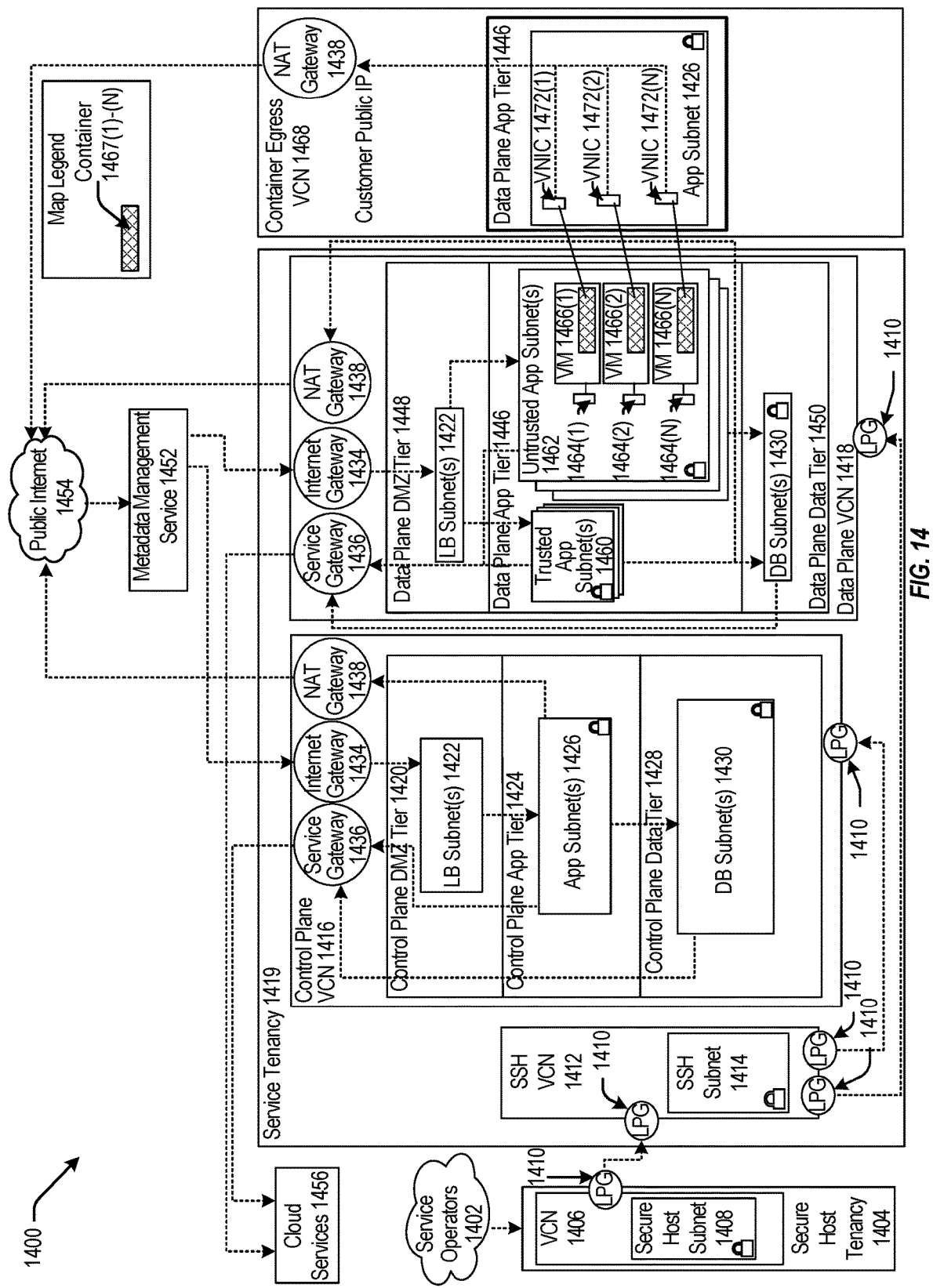
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1102 of FIG. 11) can be communicatively coupled to a secure host tenancy 1404 (e.g. the secure host tenancy 1104 of FIG. 11) that can include a virtual cloud network (VCN) 1406 (e.g. the VCN 1106 of FIG. 11) and a secure host subnet 1408 (e.g. the secure host subnet 1108 of FIG. 11). The VCN 1406 can include an LPG 1410 (e.g. the LPG 1110 of FIG. 11) that can be communicatively coupled to an SSH VCN 1412 (e.g. the SSH VCN 1112 of FIG. 11) via an LPG 1410 contained in the SSH VCN 1412. The SSH VCN 1412 can include an SSH subnet 1414 (e.g. the SSH subnet 1114 of FIG. 11), and the SSH VCN 1412 can be communicatively coupled to a control plane VCN 1416 (e.g. the control plane VCN 1116 of FIG. 11) via an LPG 1410 contained in the control plane VCN 1416 and to a data plane VCN 1418 (e.g. the data plane 1118 of FIG. 11) via an LPG 1410 contained in the data plane VCN 1418. The control plane VCN 1416 and the data plane VCN 1418 can be contained in a service tenancy 1419 (e.g. the service tenancy 1119 of FIG. 11).

The control plane VCN 1416 can include a control plane DMZ tier 1420 (e.g. the control plane DMZ tier 1120 of FIG. 11) that can include LB subnet(s) 1422 (e.g. LB subnet(s) 1122 of FIG. 11), a control plane app tier 1424 (e.g. the control plane app tier 1124 of FIG. 11) that can include app subnet(s) 1426 (e.g. app subnet(s) 1126 of FIG. 11), a control plane data tier 1428 (e.g. the control plane data tier 1128 of FIG. 11) that can include DB subnet(s) 1430 (e.g. DB subnet(s) 1330 of FIG. 13). The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1134 of FIG. 11) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 11) and a network address translation (NAT) gateway 1438 (e.g. the NAT gateway 1138 of FIG. 11). The control plane VCN 1416 can include the service gateway 1436 and the NAT gateway 1438.

The data plane VCN 1418 can include a data plane app tier 1446 (e.g. the data plane app tier 1146 of FIG. 11), a data plane DMZ tier 1448 (e.g. the data plane DMZ tier 1148 of FIG. 11), and a data plane data tier 1450 (e.g. the data plane data tier 1150 of FIG. 11). The data plane DMZ tier 1448 can include LB subnet(s) 1422 that can be communicatively coupled to trusted app subnet(s) 1460 (e.g. trusted app subnet(s) 1360 of FIG. 13) and untrusted app subnet(s) 1462 (e.g. untrusted app subnet(s) 1362 of FIG. 13) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g. public Internet 1154 of FIG. 11).

The Internet gateway 1434 contained in the control plane VCN 1416 and contained in the data plane VCN 1418 can be communicatively coupled to a metadata management service 1452 (e.g. the metadata management system 1152 of FIG. 11) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 14 may be considered an exception to the pattern illustrated by the architecture of block diagram 1300 of FIG. 13 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 15:
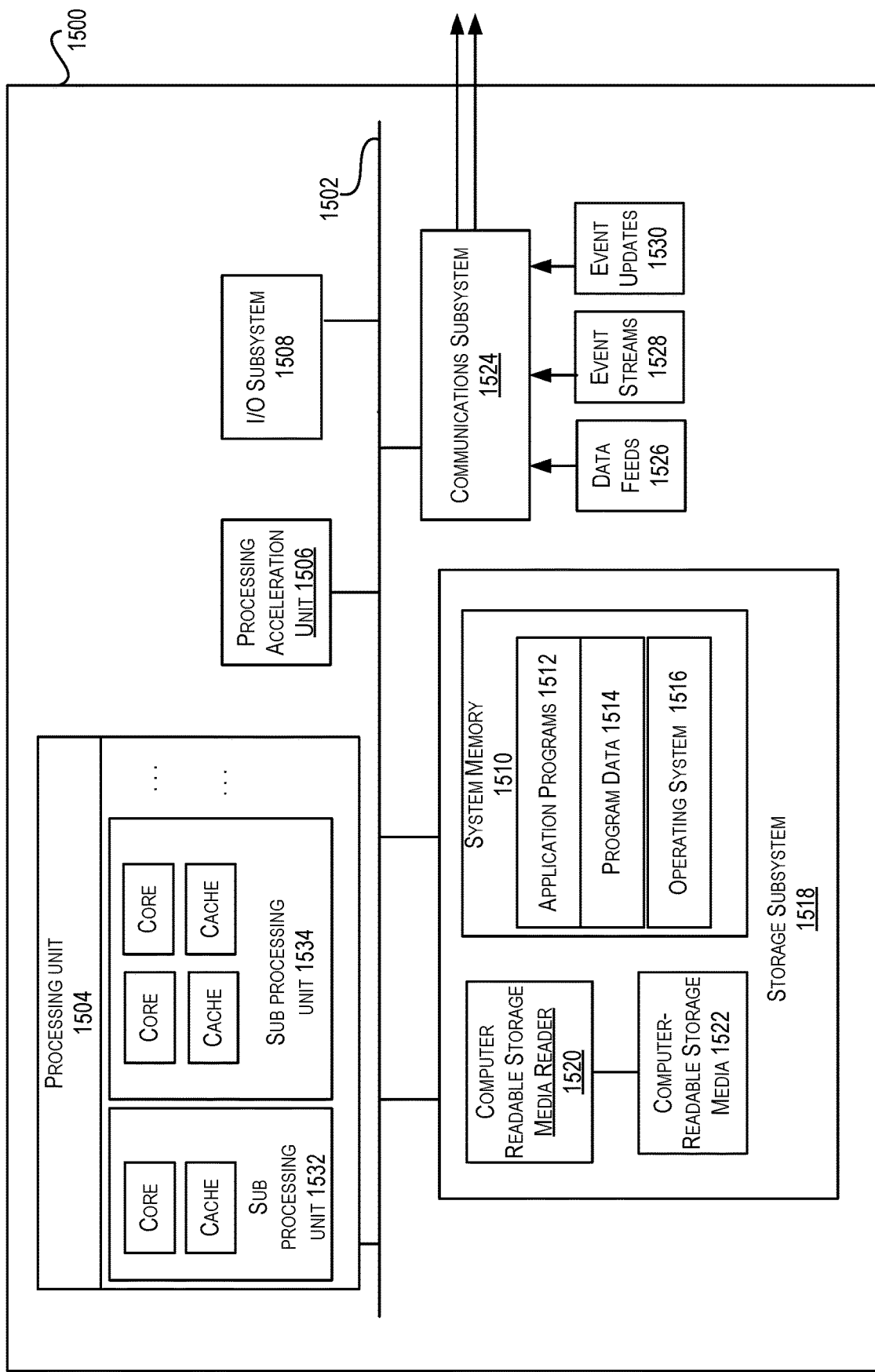
FIG. 15 is a block diagram illustrating an example computer system, according to at least one embodiment.

FIG. 15 illustrates an example computer system 1500, in which various embodiments may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 15 OS, and Palm® OS operating systems.

Storage subsystem 1518 may also provide a tangible computer-readable storage medium for storing the basic programming and data constructs that provide the functionality of some embodiments. Software (programs, code modules, instructions) that when executed by a processor provide the functionality described above may be stored in storage subsystem 1518. These software modules or instructions may be executed by processing unit 1504. Storage subsystem 1518 may also provide a repository for storing data used in accordance with the present disclosure.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   creating a network path bond between a plurality of compute instances and a plurality of Network Virtualization Devices ("NVD"), each of the plurality of NVDs comprising a Virtualized Network Interface Card ("VNIC") for each of the compute instances, each of the VNICs having an overlay Internet Protocol ("IP") address corresponding to an IP address of the compute instance associated with the VNIC, the network path bond comprising a plurality of network paths, wherein each of the plurality of network paths connects the each of the compute instances to associated VNIC of one of the plurality of NVDs;
   identifying a monitoring bond coupling the plurality of NVDs to a monitoring agent;
   creating a number of monitoring VNICs, each of the number of monitoring VNICs residing in one of the plurality of NVDs, wherein the NVDs are coupled to the monitoring agent via the monitoring VNICs;
   overlaying an IP address to each of the monitoring VNICs, wherein each of the monitoring VNICs share a common IP address;
   determining with the monitoring agent a health of at least one of network paths via responsiveness of a virtual router on the NVD of each of the at least one network paths, the network paths comprising an active network path and an inactive network path; and
   activating the inactive network path when the active network path fails.

2. The method of claim 1, further comprising identifying service tenancy.

3. The method of claim 2, wherein the service tenancy comprises an administrative virtual cloud network.

4. The method of claim 2, wherein the IP addresses are received from the service tenancy.

5. The method of claim 2, wherein the IP addresses are determined by the monitoring agent.

6. The method of claim 1, further comprising identifying one of the network paths as an active network path.

7. The method of claim 6, further comprising identifying at least one of the network paths as an inactive network path.

8. The method of claim 1, wherein at least one of the plurality of compute instances comprises a virtual machine.

9. The method of claim 1, wherein the plurality of compute instances on located on a single physical server.

10. The method of claim 1, wherein the plurality of compute instances share the active network path.

11. The method of claim 10, wherein activating the inactive network path when the active network path fails comprises: identifying all of the VNICs associated with the NVD of the failed network path; and updating routing tables to associate the overlaid IP addresses of the VNICs of the failed network path with VNICs of the activated inactive network path.

12. The method of claim 1, wherein the active network path fails when performance of the active network path drops below a threshold level.

13. The method of claim 12, wherein the threshold level identifies a minimum data transmission speed for the active network path.

14. The method of claim 1, wherein at least some of the plurality of NVDs comprise a SmartNIC.

15. The method of claim 1, wherein each of the VNICs comprises a Media Access Control ("MAC") learning VNIC.

16. The method of claim 1, wherein determining with the monitoring agent the health of at least one of network paths comprises:
   sending a communication to the active network path via the monitoring bond;
   providing information from the monitoring bond to the monitoring agent based on any response received to the communication; and
   determining the health of the at least one of the network paths with the monitoring agent based on the information provided by the monitoring bond.

17. A non-transitory computer-readable storage medium storing a plurality of instructions executable by one or more processors, the plurality of instructions when executed by the one or more processors cause the one or more processors to:
   create a network path bond between a plurality of compute instances and a plurality of Network Virtualization Devices ("NVD"), each of the plurality of NVDs comprising a Virtualized Network Interface Card ("VNIC") for each of the compute instances, each of the VNICs having an overlay Internet Protocol ("IP") address corresponding to an IP address of the compute instance associated with the VNIC, the network path bond comprising a plurality of network paths, wherein each of the plurality of network paths connects the each of the compute instances to associated VNIC of one of the plurality of NVDs;
identify a monitoring bond coupling the plurality of NVDs to a monitoring agent;
create a number of monitoring VNICs, each of the number of monitoring VNICs residing in one of the plurality of NVDs, wherein the NVDs are coupled to the monitoring agent via the monitoring VNICs;
overlay an IP address to each of the monitoring VNICs, wherein each of the monitoring VNICs share a common IP address;
determine with the monitoring agent a health of at least one of network paths via responsiveness of a virtual router on the NVD of each of the at least one network paths, the network paths comprising an active network path and an inactive network path; and
activate the inactive network path when the active network path fails.

18. The non-transitory computer-readable storage medium of claim 17, wherein the plurality of compute instances share the active network path, and wherein activating the inactive network path when the active network path fails comprises:
identifying all of the VNICs associated with the NVD of the failed network path; and
updating routing tables to associate the overlaid IP addresses of the VNICs of the failed network path with VNICs of the activated inactive network path.

19. A system comprising:
a plurality of Network Virtualization Devices ("NVD"); and
a processor configured to:
create a network path bond between a plurality of compute instances and a plurality of Network Virtualization Devices ("NVD"), each of the plurality of NVDs comprising a Virtualized Network Interface Card ("VNIC") for each of the compute instances, each of the VNICs having an overlay Internet Protocol ("IP") address corresponding to an IP address of the compute instance associated with the VNIC, the network path bond comprising a plurality of network paths, wherein each of the plurality of network paths connects the each of the compute instances to associated VNIC of one of the plurality of NVDs;
identify a monitoring bond coupling the plurality of NVDs to a monitoring agent;
create a number of monitoring VNICs, each of the number of monitoring VNICs residing in one of the plurality of NVDs, wherein the NVDs are coupled to the monitoring agent via the monitoring VNICs;
overlay an IP address to each of the monitoring VNICs, wherein each of the monitoring VNICs share a common Internet Protocol ("IP") address;
determine with the monitoring agent a health of at least one of network paths via responsiveness of a virtual router on the NVD of each of the at least one network paths, the network paths comprising an active network path and an inactive network path; and
activate the inactive network path when the active network path fails.

20. The system of claim 19, wherein the plurality of compute instances share the active network path, and wherein activating the inactive network path when the active network path fails comprises:
identifying all of the VNICs associated with the NVD of the failed network path; and
updating routing tables to associate the overlaid IP addresses of the VNICs of the failed network path with VNICs of the activated inactive network path.

* * * * *